United States Patent
Haus et al.

(10) Patent No.: US 7,424,181 B2
(45) Date of Patent: Sep. 9, 2008

(54) HITLESS SWITCH FOR HIGH-DENSITY INTEGRATED OPTICS

(75) Inventors: Hermann A. Haus, deceased, late of Lexington MA (US); by Eleanor L. Haus, legal representative, Lexington, MA (US); Milos Popovic, Richmond Hill (CA); Michael R. Watts, Hingham, MA (US); Chee Wei Wong, New York, NY (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 490 days.

(21) Appl. No.: 11/041,350

(22) Filed: Jan. 24, 2005

(65) Prior Publication Data

US 2005/0275921 A1     Dec. 15, 2005

Related U.S. Application Data

(63) Continuation-in-part of application No. 11/012,769, filed on Dec. 15, 2004, now abandoned, which is a continuation of application No. 10/833,453, filed on Apr. 28, 2004, now abandoned.

(60) Provisional application No. 60/538,736, filed on Jan. 23, 2004.

(51) Int. Cl.
*G02B 6/12* (2006.01)

(52) U.S. Cl. .............................. 385/16; 385/15; 385/17

(58) Field of Classification Search ............... 385/15–17
See application file for complete search history.

(56) References Cited

U.S. PATENT DOCUMENTS 4,142,775 A     3/1979    Ramaswamy et al.

(Continued)

FOREIGN PATENT DOCUMENTS

EP     0646832     4/1995

(Continued)

OTHER PUBLICATIONS

"Hitless Reconfigurable Add/Drop Multiplexers Using Bragg Gratings in Planar Waveguides," Madsen et al. *OSA TOPS*, vol. 29.

(Continued)

*Primary Examiner*—Jennifer Doan
(74) *Attorney, Agent, or Firm*—Gauthier & Connors LLP

(57) ABSTRACT

An optical device includes a first and a second splitting device. Each of the first and second splitting devices have respective first and second input ports, respective first and second output ports, and a respective transfer matrix. A first optical waveguide is optically coupled to the first output port of the first splitting device and the first input port of the second splitting device. A second optical waveguide is optically coupled to the second output port of the first splitting device and the second input port of the second splitting device. The first and second optical waveguides are configured to introduce a phase shift of $\pi$ radians to the optical radiation propagating through the first optical waveguide with respect to the optical radiation propagating through the second optical waveguide. The transfer matrix of the second splitting device is the diagonal transpose of the transfer matrix of the first splitting device and the transfer matrix of the second splitting device is substantially different from the transfer matrix of the first splitting device.

22 Claims, 29 Drawing Sheets

U.S. PATENT DOCUMENTS

| | | | |
|---|---|---|---|
| 4,679,893 | A | 7/1987 | Ramer |
| 5,889,899 | A | 3/1999 | Henry et al. |
| 2001/0046344 | A1 | 11/2001 | Hayashi et al. |
| 2002/0172466 | A1 | 11/2002 | Baumann et al. |
| 2006/0132792 | A1* | 6/2006 | Schultz et al. ............. 356/480 |

FOREIGN PATENT DOCUMENTS

| | | |
|---|---|---|
| WO | WO 01/88580 | 11/2001 |
| WO | WO 02/17004 | 2/2002 |
| WO | WO 02/063389 | 8/2002 |
| WO | WO 02/101421 | 12/2002 |

OTHER PUBLICATIONS

"Three-Space Representation of Phase-Mismatch Switching in Coupled Two-State Optical Systems," Korotky, *IEEE J. Quantum Electronics*, vol. QE-22, n. 6 (Jun. 1986).

"Switched Directional Couplers with Alternating Δβ," Kogelnik et al., *IEEE J. Quantum Electronics*, vol. QE-12, n. 7 (Jul. 1976).

"Crosstalk and Switching Characteristics in Directional Couplers," Weber et al. *IEEE Journal of Quantum Electronics*. Mar. 1988. vol. 24, No. 3.

"Switched Directional Couplers with Alternating Δβ," Kogelnik et al. *IEEE Journal of Quantum Electronics*. Jul. 1976. QE-12, No. 7.

"Elimination of cross talk in optical directional couplers," Haus et al. *Applied Physics Letters*. Jan. 1985. vol. 46.

"On the Crosstalk of Reversed- Δβ Directional Coupler Switches," Findakly et al. *Journal of Lightwave Technology*. Jan. 1988. vol. 6, No. 1.

"Electrically switched optical directional coupler: Cobra," Papuchon et al. *Applied Physics Letters*. Sep. 1975. vol. 27, No. 5.

"GaAs Electro-optic directional-coupler switch," Campbell et al. *Applied Physics Letters*. Aug. 1975. vol. 27, No. 4.

"Switches and Crossconnects," Bowers, J.E., *Technical Digest* (1998).

"A Multi-port Add/Drop Router Using UV-induced Gratings in Planar Waveguides," Madsen et al., *Lucent Technologies*, (1999).

* cited by examiner

Top View

Top View

HITLESS SWITCH FOR HIGH-DENSITY INTEGRATED OPTICS

PRIORITY INFORMATION

This application is a continuation-in-part of U.S. patent application Ser. No. 11/012,769 filed Dec. 15, 2004, now abandoned which is a continuation of U.S. patent application Ser. No. 10/833,453 filed Apr. 28, 2004, now abandoned which claims priority from provisional application Ser. No. 60/538,736 filed Jan. 23, 2004, all of which are incorporated herein by reference in their entireties.

BACKGROUND OF THE INVENTION

The invention relates to the field of integrated optics, and in particular to a spatial diversity scheme particularly suitable for a hitless switch for integrated optics.

A distinct advantage of Integrated Optical Circuit (IOC) devices is that they are suitable for direct coupling to optical fibers since the guided light wave is well confined in both transverse dimensions. An electro-optic directional coupler switch comprises two parallel strip line waveguides forming a passive directional coupler with an electro-optic pad at the edge of each waveguide. Initially, light is focused onto one of the waveguides and the amount of light coupled to the adjacent channel can be controlled electro-optically. This scheme not only permits direct amplitude modulation of the light propagating in one channel, but allows light to be switched from one channel to another.

Wavelength-division-multiplexed (WDM) optical transmission systems carry multiple wavelength channels simultaneously on a single guiding optical line. Dynamic reconfiguration of functional optical components that operate on a subset of the used WDM spectrum may be employed to reroute one or more WDM signals around a broken link in the network, to add/drop one or more wavelength channels at a network node, or to perform other signal processing operations on a wavelength-selective basis. It is preferable that during the dynamic reconfiguration of such optical components, which operate on a subset of the WDM spectrum, the data flow on other wavelength channels not be interrupted or deteriorated during the reconfiguration operation. This is referred to as hitless switching or hitless reconfiguration of the optical component.

SUMMARY OF THE INVENTION

According to one aspect of the invention, there is provided an optical device. The optical device includes a first and a second splitting device. Each of the first and second splitting devices have respective first and second input ports, respective first and second output ports, and a respective transfer matrix. A first optical waveguide is optically coupled to the first output port of the first splitting device and the first input port of the second splitting device. A second optical waveguide is optically coupled to the second output port of the first splitting device and the second input port of the second splitting device. The first and second optical waveguides are configured to introduce a phase shift of $\pi$ radians to the optical radiation propagating through the first optical waveguide with respect to the optical radiation propagating through the second optical waveguide. The transfer matrix of the second splitting device is the diagonal transpose of the transfer matrix of the first splitting device and the transfer matrix of the second splitting device is substantially different from the transfer matrix of the first splitting device.

According to another aspect of the invention, there is provided a method of propagating optical radiation in an optical device. The method includes providing a first and a second coupler, each of the first and second coupler having a respective transfer matrix, and providing that the transfer matrix of the second coupler is the diagonal transpose of the transfer matrix of the first coupler. A first optical waveguide is optically coupled to the first coupler and the second coupler. A second optical waveguide is optically coupled to the first coupler and the second coupler. Also, the method includes configuring the first and second optical waveguide to introduce a phase shift of $\pi$ to the optical radiation propagating through the first optical waveguide with respect to the optical radiation propagating through the second optical waveguide.

According to another aspect of the invention, there is provided an optical device. The optical device includes a first and a second splitting device, each of the first and second splitting device having respective first and second input port, respective first and second output port and a respective transfer matrix. A first optical waveguide is optically coupling to the first output port of the first splitting device and the first input port of the second splitting device. A second optical waveguide is optically coupled to the second output port of the first splitting device and the second input port of the second splitting device. The first and second optical waveguide are configured to introduce a phase shift of $\pi$ radians to the optical radiation propagating through the first optical waveguide with respect to the optical radiation propagating through the second optical waveguide. The transfer matrix of the second splitting device is the full transpose of the transfer matrix of the first splitting device. The transfer matrix of the second splitting device is substantially different from the transfer matrix of the first splitting device and the transfer matrix of the first splitting device has the off-diagonal elements equal.

According to another aspect of the invention, there is provided an optical single layer MEMS device. The optical single layer MEMS device includes a first and a second coupler. A first optical waveguide is optically coupled to the first coupler and the second coupler. A second optical waveguide is optically coupled to the first coupler and the second coupler. Sideways perturbations by the MEMS device are used to perform operations of an optical switch.

DETAILED DESCRIPTION OF THE INVENTION

Advantage could be derived for integrated optical devices from a simple integrated-optical "spatial diversity" scheme, that would provide for a broadband input signal on one waveguide (such as a collection of channels on a WDM optical signal) to be divided and routed along a number of physical waveguide paths, before being perfectly recombined in one output waveguide. The input signal may be split among the several paths according to a set splitting ratio, preferably controllable by a switch, and in a broadband or wavelength-dependent manner over the wavelength range of interest.

The separated physical paths provide a simple way to operate on only part of the optical input signal, the part in one of the paths, by inserting a particular optical device in that path. For example, hitless reconfiguration of a channel add-drop filter can be obtained by placing the filter in one path, and then directing all input light through the filter path under normal operation, or through the second bypass path during filter reconfiguration (e.g. wavelength tuning), as is to be described herein.

The challenge in producing such a spatial diversity scheme is the difficulty of ensuring perfect recombination of the spatially divided signals at the output independently of wavelength, and, for reconfigurable schemes involving switches, even during switch reconfiguration.

The invention provides a design for 2-way spatial diversity schemes that take a broadband input signal entering via one waveguide, split it among two paths in a fixed or controllable, broadband or wavelength-dependent way (over the wavelength range of interest), and identically recombine all signal (at all wavelengths) into a single waveguide again at the output. A specific symmetry is employed to guarantee broadband recombination, so the scheme works for a large class of devices, with various possible applications. The signal splitting ratio among the two paths within the spatial diversity scheme may be substantially wavelength dependent or substantially wavelength independent over the wavelength range of interest. The splitting ratio may be fixed or controllable. The invention achieves spatial diversity for a large class of signal splitting device designs by employing low-loss 4-port devices and time-reversal symmetry.

Figure 1:
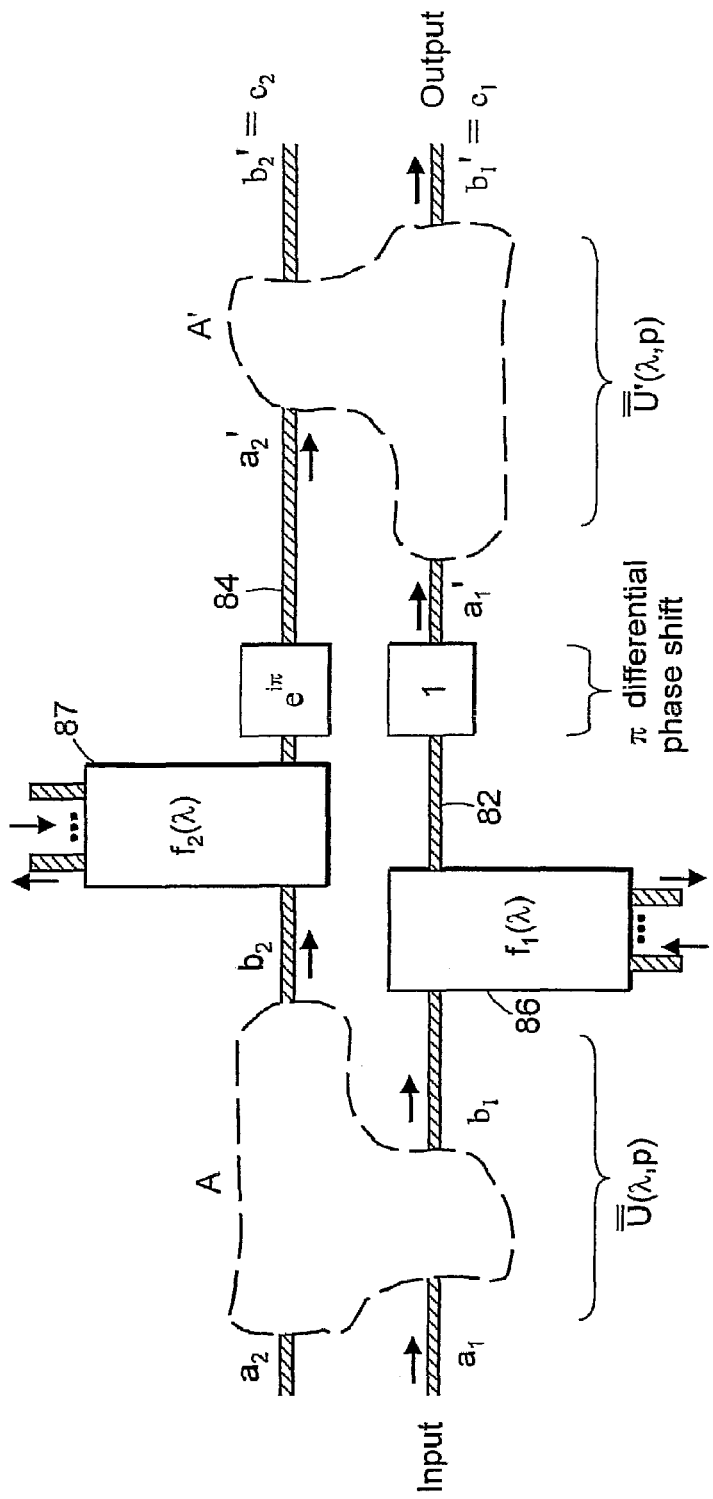
FIG. 1 is a schematic diagram of the inventive general spatial diversity scheme using electromagnetically reciprocal optical signal splitting/recombining blocks A and A'.
Figure 2:
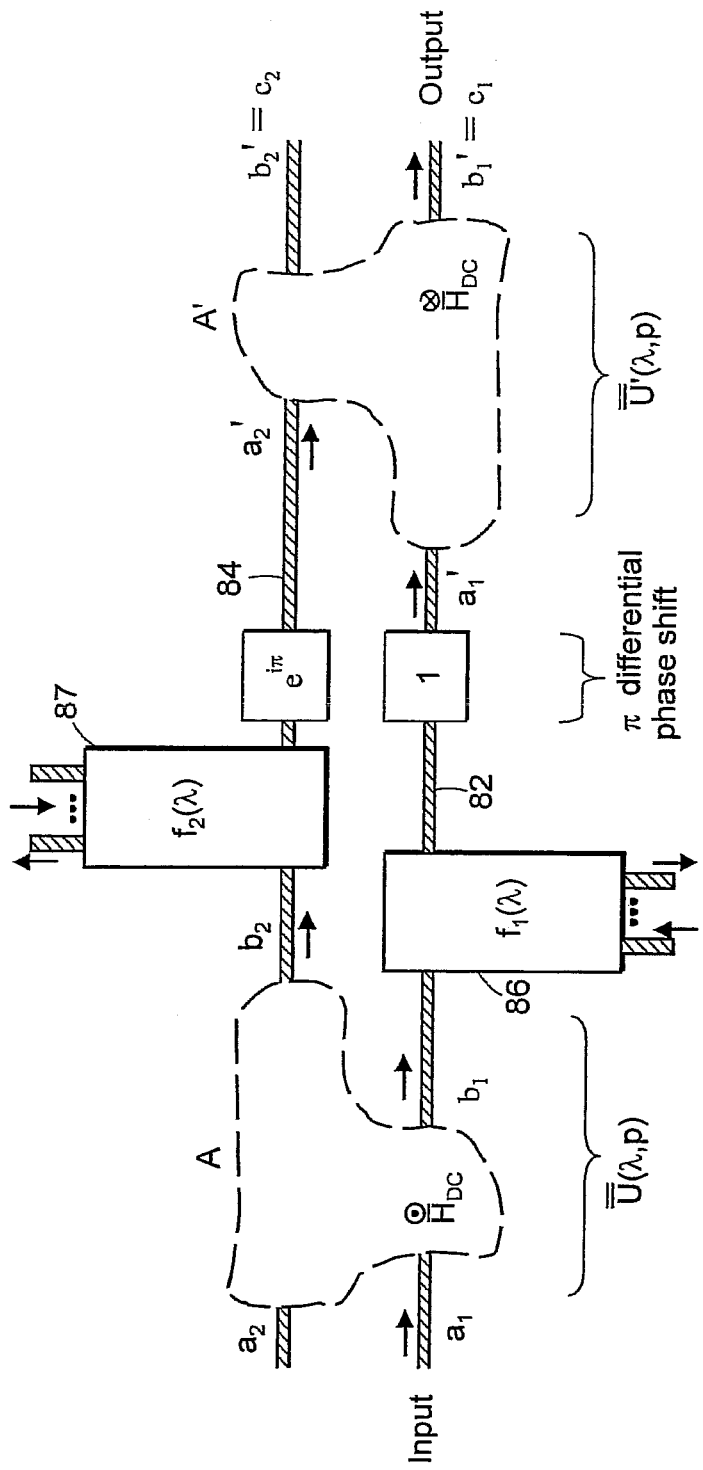
FIG. 2 is a schematic diagram of the inventive general spatial diversity scheme using non-reciprocal optical signal splitting blocks A and A'; where the built-in and/or applied magnetic fields $H_{DC}$ are schematically indicated to be in opposite directions.

The general design scheme of the present invention, shown in FIGS. 1 and 2, provides an arbitrary 4-port optical splitting device A with two input ports ($a_1$, $a_2$) and two output ports ($b_1$, $b_2$), that is substantially lossless and reflectionless (substantially all power put into inputs comes out of the two outputs only, with little reflection to either input). A second optical splitting device A', also substantially lossless and reflectionless, has two input ports labeled $a_1'$, $a_2'$, and two output ports labeled $b_1'$, $b_2'$ in FIGS. 1 and 2. A first optical path 82 connects output port $b_1$ of splitting device A to input port $a_1'$ of splitting device A' and a second optical path 84 connects output port $b_2$ of splitting device A to input port $a_2'$ of splitting device A'. Conventionally, in the present description the ports numbered with the subscript 1 are associated to one of the optical path (in FIG. 1 the bottom waveguide 82), and those numbered with the subscript 2 to the other optical path (here the top waveguide 84). Without loss of generality, the splitting device A' may be represented as a structurally identical copy of device A but operating in reverse with respect to A (for the convention in FIGS. 1, 2 where signal propagates from left to right, this means doing a mirror symmetric replica of the splitting device A with respect to a vertical axis between A and A' in FIGS. 1, 2) and, in addition, being up-side-down with respect to A (for the schematic diagram of FIGS. 1, 2 where the structure is in a straight, planar configuration, this means doing a further mirror symmetric replica of the splitting device obtained from the vertical replica above with respect to a horizontal axis in FIGS. 1, 2). The latter condition is equivalent, given the convention above, to swapping the port-subscript assignment for the four ports of the splitting device obtained with the first vertical reflection (i.e. A' is a mirror symmetric replica of the splitting device A with respect to a vertical axis between A and A' and the two waveguides connecting A and A' 'cross-over' so as to connect the ports according to the above). The two requirements for the splitting device A' (i.e. reflection about a vertical axis, followed by reflection about a horizontal axis) may equivalently be represented, with reference to the schematic diagrams of FIGS. 1 and 2 where the two waveguides are parallel, with a 180-degree rotation of the second device A' with respect to the first 4-port device A.

In the particular case wherein the first splitting device A is invariant for mirror reflection about a vertical symmetry axis, the two operations above reduce to just mirror reflection about a horizontal axis.

The splitting device A, A' may comprise any arbitrary device that meet the above requirements including waveguide directional couplers and switches, Mach-Zehnder interferometers (MZIs), multi-mode interference couplers (MMIs), ring-resonator filters or other optical elements. A switch is a splitting device configured to assume alternatively a first and a second state, wherein in the first state an optical radiation input only in the first input port is directed substantially solely to the first output port and in the second state an optical radiation input only in the first input port is directed substantially solely to the second output port. The splitting device A, A' may be wavelength-dependent over the wavelength band of interest. They may be controllable in their splitting operation (i.e. contain switches, tunable elements, etc.).

In the case of non-reciprocal devices A, A' (i.e. optical devices comprising non-reciprocal media that support Faraday rotation), A' deviates from being structurally identical to A only in the aspect that any built-in or applied DC magnetic fields are reversed (i.e. opposite orientation of aligned magnetic dipoles) in A' with respect to optical device A, as symbolically shown in FIG. 2. For non-reciprocal devices A, A', when doing the operation of reversing (i.e. vertical symmetry mirror reflection), it will be assumed that any DC magnetic field is reversed as well. We will refer to a pair of splitting devices structurally identical but operating in reverse according to the above, as a "time-reversal pair" (mirror symmetric with respect to a vertical axis in FIGS. 1,2). FIG. 2 illustrates a general design for non-reciprocal devices A, A'. FIG. 2 is similar to FIG. 1 except that A' has the opposite sign of built-in DC magnetic fields (illustrated as $H_{DC}$ in FIG. 2) with respect to DC magnetic fields of A.

The pair of waveguides 82, 84, or more generally a pair of provided optical modes, provides ideally a π radians phase shift difference between the two waveguides 82, 84 or optical modes, over the propagation length from optical device A to optical device A', over the wavelength spectrum of interest.

All designs with the above characteristic put all signals entering port $a_1$ into output port $b_1'$, or alternatively, all signals entering $a_2$ into port $b_2'$. This does not depend on the particular type of splitting devices A and A', nor on their wavelength dependence, if any. The signal recombination is perfect for all wavelengths at the output if: the devices A, A' are lossless and are a "time-reversal pair", they are connected by two waveguides in the manner described herein and illustrated in FIGS. 1,2, and the π differential phase shift in the waveguides connecting them is broadband over the wavelength range of interest.

The spatial diversity scheme described herein becomes useful, for example, for creating designs for hitless switching of integrated channel add-drop filters or hitless bypass of another type of optical device, when a functional optical device, 86 or 87, is inserted into one arm 82 or 84, respectively. Optionally, several functional optical devices (86, 87 in FIGS. 1 and 2) may be inserted into both waveguide arms 82, 84 of the spatial diversity scheme between device A and A', as shown in FIG. 1, 2. The functional optical devices 86, 87 mentioned can be any optical element (e.g. section of straight waveguide, directional coupler, channel add-drop filter, amplifier, variable optical attenuator, etc.). When inserted, they should ideally not disturb the π differential phase shift between the arms 82, 84, over the wavelength range that is desired to recombine in the output waveguide as provided by the described scheme. Alternatively, any phase distortion over the spectrum of interest that is introduced by functional optical device 86 or 87 in one arm 82 or 84, respectively, may be compensated by proper design of a second device 87 or 86 for that purpose in the other arm 84 or 82.

This spatial diversity scheme described herein is superior to approaches in prior art in that: (a) recombination of all input light at the output of the diversity scheme is not dependent on the particular type of input splitting device A and output recombiner device A' used. The described configuration guarantees wavelength-independent and parameter-independent ideal recombination. Thus, the property of the scheme to fully recombine all input radiation from one input port into one output port is also not sensitive to wavelength dependence or fabrication error in parameters of the elements A and A', so long as they remain structurally substantially identical, which is very often the case for lithographic fabrication errors; (b) in case A and A' are variable, controllable optical devices (such as switches) the scheme here requires only symmetric (in unison) actuation of A and A', such that they remain structurally identical at all times, to achieve hitless switching of the light path between one arm 82 and the other arm 84. This is superior to some schemes in prior art that require a different and dependent adjustment of the output recombination element A' in response to the particular setting of the input splitter element A, in order to ensure perfect recombination into one output port. Such active control schemes are difficult to implement in that the feedback and control problem can be complex. The scheme described herein is considerably simpler in that one must only ensure that A and A' are identically actuated at any one time, making the control problem much simpler and more tractable.

The derivation of the concept design that follows is general, and encompasses a large class of splitting devices A and A', because it relies only on losslessness of the elements A, A' in the sense defined, and time-reversibility, which is a known property of the Maxwell's equations that govern behavior of integrated optical devices (true even for non-reciprocal devices, if reversing DC magnetic fields is permitted). This is the reason why the presented scheme holds for both reciprocal and non-reciprocal devices A and A', as shown below.

Optical splitting devices A, A' are preferably to be identical lossless 4-ports (except for having opposite DC magnetic fields if non-reciprocal media are used), where a port is defined to correspond to a single guided optical mode that is coupled to the respective optical device A or A', and where the ports may be chosen in pairs such that all power sent into any one port (belonging to one pair) is fully transmitted to two of the four ports (the other pair) with no reflection to the input port or to the second port in the pair including the input port. Low loss in transmission of A and A' is important only insofar as the phase relationship between the output ports is not significantly altered in comparison to that restricted by the lossless condition, as discussed further later in the text. In practice, errors up to ~30% in the phase produce tolerable hit loss of <1 dB. Depending on the particular choice of device A, A', losses of the order of 50% (3 dB) may be tolerable, but for practical applications losses <10% are more preferable, and substantially lower losses <1% are even more preferable. In terms of reflection, for proper operation reflection levels less than −10 dB should be acceptable, although greater reflection suppression of >20 dB is more preferable. Preferably, each port is accessed by a single-mode waveguide, such that two input waveguides and two output waveguides are present. More generally, any structure may be used that provides the guided modes to serve as the two input or output ports, such as, for example, a two-moded waveguide for each of the input and output port sets.

The transmission response of a 2×2 4-port optical device A (and analogously A') with no reflection to input ports can be represented by a 2×2 matrix, $$\bar{b} = \overline{\overline{U}} \cdot \bar{a} = \begin{bmatrix} u_{11} & u_{12} \\ u_{21} & u_{22} \end{bmatrix} \bar{a} \quad (1)$$

where $u_{mn} \equiv |u_{mn}| e^{i\phi_{mn}}$, and where $\bar{a} = [a_1, a_2]^T$ are the input waveguide mode amplitudes and $\bar{b} = [b_1, b_2]^T$ are the output mode amplitudes (as shown in FIG. 1 and FIG. 2), normalized so that their square magnitudes represent the power. If in addition there is no loss, the matrix $\overline{\overline{U}}$ is unitary ($\overline{\overline{U}}^\dagger \overline{\overline{U}} = \overline{\overline{I}}$), and thus in the most general case takes the form, $$\overline{\overline{U}} = e^{i\theta_o} \begin{bmatrix} \sqrt{1-\kappa}\, e^{i\theta_1} & i\sqrt{\kappa}\, e^{i\theta_2} \\ i\sqrt{\kappa}\, e^{-i\theta_2} & \sqrt{1-\kappa}\, e^{-i\theta_1} \end{bmatrix} \quad (2)$$

where there are four free parameters represented by real numbers $\kappa$, $\theta_o \equiv (\phi_{11}+\phi_{22})/2$, $\theta_1 \equiv (\phi_{11}-\phi_{22})/2$ and $\theta_2 \equiv (\phi_{12}-\phi_{21})/2$. For any choice of these parameters the total output power equals the total input power, $\bar{b}^\dagger \bar{b} = \bar{a}^\dagger \bar{a}$ (i.e. $|b_1|^2 + |b_2|^2 = |a_1|^2 + |a_2|^2$).

The number of parameters in $\overline{\overline{U}}$, as shown in equation (2), that may be freely chosen was restricted to four ($\kappa$, $\theta_o$, $\theta_1$, and $\theta_2$) by using the requirement of unitarity that $\phi_{11}+\phi_{22}-\phi_{12}-\phi_{21}=\pm\pi$. The $\pi$ phase in the previous relationship is important, and is related to the customary 90° phase lag of waves coupling each way across standard directional couplers. In fact, any general 2×2-port device with a particular set of the four parameters $\kappa$, $\theta_o$, $\theta_1$, and $\theta_2$ can be modeled at any one optical frequency as a particular ideal directional coupler.

In the following, the transfer matrix of the first optical splitting device A will be represented by the matrix $\overline{\overline{U}}$. According to the requirements set out above for the devices A and A', the analogous transfer matrix $\overline{\overline{U'}}$ of device A' (defined by equation (1) with all variables primed) is found to be directly related to the matrix $\overline{\overline{U}}$ of device A as, $$\overline{\overline{U'}} \equiv \begin{bmatrix} u'_{11} & u'_{12} \\ u'_{21} & u'_{22} \end{bmatrix} = \begin{bmatrix} u_{22} & u_{12} \\ u_{21} & u_{11} \end{bmatrix} = e^{i\theta_o} \begin{bmatrix} \sqrt{1-\kappa}\, e^{-i\theta_1} & i\sqrt{\kappa}\, e^{i\theta_2} \\ i\sqrt{\kappa}\, e^{-i\theta_2} & \sqrt{1-\kappa}\, e^{i\theta_1} \end{bmatrix} \quad (3)$$

The transfer matrix $\overline{\overline{U'}}$ of A' in equation (3) is the same as $\overline{\overline{U}}$, but with the diagonal elements swapped—let us call $\overline{\overline{U'}}$ the "diagonal transpose" of $\overline{\overline{U}}$. The term "diagonal transpose" of a 2×2 matrix $\overline{\overline{U}}$, for purposes of this document, refers to a matrix whose diagonal elements, $u_{11}$ and $u_{22}$, are swapped. The equivalence of the specified configuration requirements for devices A and A' in the inventive scheme with the stated relationship between their matrices $\overline{\overline{U}}$ and $\overline{\overline{U'}}$ is rigorously justified later on in the text.

The total transfer matrix of the device providing the spatial diversity scheme of FIGS. 1 and 2 involves the first element A ($\overline{\overline{U}}$), the differential $\pi$ phase shift matrix associated with the two arms 82 and 84, and the matrix $\overline{\overline{U'}}$ of the second element A':

$$\overline{\overline{T}} = \overline{\overline{U'}} \begin{bmatrix} 1 & 0 \\ 0 & e^{i\pi} \end{bmatrix} \overline{\overline{U}}. \quad (4)$$

The transfer matrix $\overline{\overline{T}}$ is defined to relate outputs $\bar{c} = [c_1, c_2]^T$ and inputs $\bar{a} = [a_1, a_2]^T$, as $\bar{c} = \overline{\overline{T}} \cdot \bar{a}$ (as shown in FIGS. 1 and 2). Further, using the general forms of $\overline{\overline{U}}$ and $\overline{\overline{U'}}$ in equations (2) and (3), without any assumptions about the free parameters, (4) becomes $$\overline{\overline{T}} = e^{i2\theta_o} \begin{bmatrix} 1 & 0 \\ 0 & -1 \end{bmatrix}. \quad (5)$$

Since the magnitude of matrix elements $T_{11}$ and $T_{22}$ is unity and $T_{12} = T_{21} = 0$, where we have made minimal assumptions (unitarity) about the matrix $\overline{\overline{U}}$ describing element A, this shows that the scheme described is a general 2-way spatial diversity scheme that intrinsically recombines all input to one final output, independent of the particular type of 2×2 optical elements A and A' used, and independent of wavelength. Signal entering port $a_1$ is recombined in $c_1$ (i.e. $b_1'$), while that entering $a_2$ is recombined in $c_2$ (i.e. $b_2'$), according to equation (5). The perfect signal recombination at the output is as broadband as the $\pi$ phase shift realization employed. The details of signal splitting between the two arms, 82 and 84 in FIG. 1, (wavelength dependence, fixed or controllable) depend on the particular 2×2 optical elements A and A' used.

The parameters of matrix $\overline{\overline{U}}$ describing the 2×2 optical splitting device A may be wavelength-dependent over the wavelength range of interest and/or controllable (e.g. a switch), i.e. $\overline{\overline{U}} = \overline{\overline{U}}(\lambda, p)$, where p parameterizes possible configurations for a dynamic element such as a switch (range of states). Namely, $|T_{11}|^2 = |T_{22}|^2 = 1$ for all $\lambda$ and p.

The complete recombination of light input in one port into one output port that is guaranteed by this scheme will not be affected by arbitrary phase factors applied to each output port of the element A', since such phase factors do not affect the unity magnitude of the elements $T_{11}$ and $T_{22}$ of the total transfer matrix of the scheme as shown in equation (5). Although in cases where devices A and A' are an exact "time-reversal pair" connected as in FIGS. 1,2 (up-side-down) the transfer matrix describing device A' will be the "diagonal transpose" of the matrix describing device A, in the most general case, the general matrix $\overline{\overline{V'}}$ for A' may further differ by arbitrary phases $\psi_1$ and $\psi_2$ in the first and second arm (82 and 84, respectively, in FIGS. 1 and 2), as follows:

$$\overline{\overline{V'}} = \begin{bmatrix} e^{i\psi_1} & 0 \\ 0 & e^{i\psi_2} \end{bmatrix} \overline{\overline{U'}} = e^{i\theta_o} \begin{bmatrix} \sqrt{1-\kappa}\, e^{i\theta_1} e^{i\psi_1} & i\sqrt{\kappa}\, e^{i\theta_2} e^{i\psi_1} \\ i\sqrt{\kappa}\, e^{-i\theta_2} e^{i\psi_2} & \sqrt{1-\kappa}\, e^{-i\theta_1} e^{i\psi_2} \end{bmatrix} \quad (6)$$

where $\psi_1$, $\psi_2$ are arbitrary real numbers and may depend on (be a function of) wavelength. Since matrix $\overline{\overline{V'}}$ is the same as $\overline{U}'$ except for arbitrarily different phase applied at output ports, one can call $\overline{V}'$ to be "output-phase-equivalent" to matrix $\overline{U}'$. Thus, the scheme of the present invention more generally comprises a first element A described by a matrix $\overline{U}$ with arbitrary choice of its 4 free parameters $\kappa$, $\theta_o$, $\theta_1$, $\theta_2$ as specified in equation (2), a $\pi$ differential phase shift in the waveguide arms 82, 84, and a second element A' with a matrix $\overline{V}'$, shown in equation (6), that is the "diagonal transpose" of chosen matrix $\overline{U}$ of first element A, but with additional arbitrary phases $\psi_1$ and $\psi_2$ applied to the top and bottom rows of the matrix, respectively. This general scheme gives $|T_{11}|=|T_{22}|=1$, $T_{12}=T_{21}=0$, for all wavelengths and all choices of parameters $\kappa$, $\theta_o$, $\theta_1$, $\theta_2$ for splitting device A, and any additional arbitrary phases $\psi_1$, $\psi_2$ that may be chosen for A'. In the remainder of the document, the preferable configuration using matrices $\overline{U}$ and $\overline{U}'$ will be used, with the understanding that in the more general case, the more general matrix $\overline{V}'$ replaces $\overline{U}'$, i.e. a more general device A' is permitted.

In view of the described configuration of the inventive spatial diversity scheme in terms of transfer matrices, there are several equivalent ways to state the corresponding desired physical configuration of the scheme. In the transfer matrix description above, the spatial diversity scheme of the present invention provides a first 4-port optical element A, with 2 input ports and 2 output ports, such that substantially all power sent into the input ports exits the output ports; in other words an element A described by a matrix of the form $\overline{U}$ in equation (2) with any choice of the 4 free parameters $\kappa$, $\theta_o$, $\theta_1$, $\theta_2$; where these parameters can vary with wavelength and, if the optical device A is reconfigurable, with time. It is further required to provide a second 4-port optical element A', with 2 input ports and 2 output ports, and described by a matrix $\overline{V}'$, where the matrix $\overline{V}'$ is equal to $\overline{U}'$, the "diagonal transpose" of matrix $\overline{U}$ that describes the first element A, or be alternatively any matrix that is "output-phase-equivalent" to $\overline{U}'$. Further, it is required to connect output $b_1$ of device A to input $a_1'$ of device A', and output $b_2$ of A to input $a_2'$ of A' whereby the two previously described connecting paths must introduce a $\pi$ differential optical propagation phase between them. Inputs and outputs are numbered in the present document such that the subscript 1 and 2 indicate respectively the top and bottom component of the input and output vector (see equation (1)), and in the presented figures, FIGS. 1 and 2, correspond to the bottom 82 and top 84 waveguides, respectively.

A second equivalent physical description may be made. In the case where reciprocal devices A and A' are used, A and A' are preferably structurally identical (setting the additional arbitrary phases $\psi_1=\psi_2=0$). Then, the scheme simplifies to: a first 4-port substantially lossless 2×2 optical element A (one described by a matrix of form $\overline{U}$) with ports P, Q, R, S, where P, Q are inputs and R, S are outputs; a second element A' that is identical to A with the corresponding ports P', Q', R', S', but where now R', S' are used as input ports and P', Q' are used as output ports (corresponding to vertical-axis mirror reflection of A' with respect to A in FIGS. 1,2); elements A and A' being connected by waveguides connecting port R to port S', and port S to port R' (corresponding to horizontal-axis mirror reflection of A' with respect to A in FIGS. 1,2); finally, the optical connection paths R-S' and S-R' imposing a $\pi$ relative phase difference in propagation. The two mirror reflections (vertical and horizontal) implied in the context of the arrangement of A' and A in FIGS. 1,2 are equivalent to a 180-degree rotation of A' with respect to A.

The required "diagonal transpose" relationship of matrix $\overline{U}'$ of element A' to matrix $\overline{U}$ of element A, stated in equation (3), can be derived as follows, without any loss of generality for the claimed invention.

An element A that splits radiation entering a single port into two arbitrary parts, if viewed with time running backwards, may intuitively be seen as having radiation propagating in the opposite direction and retracing its path to recombine the two separated parts back into the single input. This "time-reversed" operation is permitted by Maxwell's equations which govern the device operation, if the magnetic fields are reversed. The time-reversed solution of the device A (with a transfer matrix subscripted by tr), is analogous to "running the movie" of the propagating electric and magnetic fields backwards. In that solution, the outputs become the inputs ( $\overline{b}^* \to \overline{a}_{tr}$), the inputs become the outputs ($\overline{a}^* \to \overline{b}_{tr}$) and the time-reversed transfer matrix is $\overline{U}_{tr}=[\overline{U}^*]^{-1}$. In addition, in the time-reversed solution, just as the mode amplitudes $\overline{a}$, $\overline{b}$ are conjugated (so that a relative phase delay between ports in forward operation becomes reversed in time-reversed operation, as required), so the material properties (respective dielectric permittivity and magnetic permeability tensors) must be conjugated as $\overline{\overline{\epsilon}} \to \overline{\overline{\epsilon}}^*$ and $\overline{\overline{\mu}} \to \overline{\overline{\mu}}^*$. It is known that for lossless media $\overline{\overline{\epsilon}}=\overline{\overline{\epsilon}}^\dagger$, $\overline{\overline{\mu}}=\overline{\overline{\mu}}^\dagger$, and for reciprocal media $\overline{\overline{\epsilon}}=\overline{\overline{\epsilon}}^T$, $\overline{\overline{\mu}}=\overline{\overline{\mu}}^T$. Thus, for optical components composed of lossless, reciprocal media $\overline{\overline{\epsilon}}$ and $\overline{\overline{\mu}}$ are real tensor functions of space, giving the material spatial distribution representing the device, and the time-forward and time-reversed solution are supported by one and the same structure. For non-reciprocal lossless media, the time-reversed solution is supported by a structure with reversed orientation of the built-in (and any applied) DC magnetic fields in the material.

The above suggests that cascading a splitting device A and its time-reverse structure (in the context of FIGS. 1,2, where propagation is from left to right—mirror image about the vertical axis, and conjugated $\overline{\overline{\epsilon}}$, $\overline{\overline{\mu}}$) should permit one to recombine the split signal back into one waveguide by the symmetry. The problem remains, however, that the relative phase delay between the signals split at the outputs of A must be reversed prior to entering the second element, as described. While the solution to this may be attempted by design of the interconnecting waveguides to introduce the correct phase difference, any such designs depend on the particular structure A and are particularly complicated for devices with wavelength dependence over the spectrum of interest and for dynamic devices where they must further dynamically adjust to the state of structure A. However, it may be noted by comparing the left and right columns of the general form of matrix $\overline{U}$ in equation (2) that, disregarding the common phase $\theta_o$, applying an input signal to the second input port results in the same splitting ratio, but in a port phase difference of $$\frac{\pi}{2} - (\theta_1 - \theta_2)$$

in the two output ports, in comparison to $$\frac{\pi}{2} + (\theta_1 - \theta_2)$$

when the first input is excited. Therefore, the time-reversed version of the first device A with the second input port excited, when cascaded after the first device A with its first input port excited, cancels the variable phases $\theta_1, \theta_2$ to yield a total phase difference of $\pi$. This remaining difference of $\pi$ is independent of the particular device A and is compensated in the inventive scheme by a proper design of the waveguide pair connecting the two devices A and A' to compensate the $\pi$ phase shift difference between the ports over the wavelength band of interest. From equation (2), one also notes that the splitting ratio is the same when the first or second input port is excited, but that the fraction of light in each output port is opposite in the two respective cases. Therefore, in order for the time-reversed structure A' to recombine the signals split by structure A, the ports 1 and 2 of the second structure A' must further be reversed with respect to the first structure A. This is the reason for the additional mirror reflection of with respect to a horizontal axis of A' in relation to A, in FIGS. 1,2 of the inventive scheme.

Thus, the spatial diversity scheme presented herein is built from one 2×2 optical element A, followed by a differential $\pi$ phase shift in the output arms, and a time-reversed version A' of the first element A such that, in addition, the outputs $b_{1,2}$ of the first element are connected to their respective equivalents in A' in swapped order, that is to the time-reversed inputs $a'_{1,2}$, respectively in that order (as shown in FIGS. 1 and 2). The total transfer matrix of the device providing the spatial diversity scheme involves the first element A ($\overline{U}$), the differential $\pi$ phase shift matrix, and the matrix of the second, time-reversed element ($\overline{U}_{tr}$), plus two matrices around $\overline{U}_{tr}$ to account for the swapping of signal paths 1 and 2 in device A' (i.e. the mirror-reflection about a horizontal axis of A' with respect to A in FIGS. 1, 2):

$$\overline{T} = \begin{bmatrix} 0 & 1 \\ 1 & 0 \end{bmatrix} \overline{U}_{tr} \begin{bmatrix} 0 & 1 \\ 1 & 0 \end{bmatrix} \begin{bmatrix} 1 & 0 \\ 0 & e^{i\pi} \end{bmatrix} \overline{U}. \qquad (7)$$

This is the same transfer matrix $\overline{T}$ as that in equation (4), and thus the first three matrices represent the total transfer matrix $\overline{U'}$ of element A'. Matrix $\overline{U}_{tr}$ represents the mirror reflection about the vertical axis of element A' with respect to element A, while the pre- and post-multiplication [0,1; 1,0] matrices represent the additional mirror reflection about the horizontal axis of A' with respect to A. Using unitarity of $\overline{U}$, the time-reverse transfer matrix $\overline{U}_{tr}$ is found to be the transpose of $\overline{U}$, $\overline{U}_{tr} \equiv [\overline{U}^*]^{-1} = \overline{U}^T$, and by comparing equations (4) and (7), the transfer matrix $\overline{U'}$ for A' is $$\overline{U'} = \begin{bmatrix} 0 & 1 \\ 1 & 0 \end{bmatrix} \overline{U}_{tr} \begin{bmatrix} 0 & 1 \\ 1 & 0 \end{bmatrix} = \begin{bmatrix} 0 & 1 \\ 1 & 0 \end{bmatrix} \overline{U}^T \begin{bmatrix} 0 & 1 \\ 1 & 0 \end{bmatrix} = \begin{bmatrix} u_{22} & u_{12} \\ u_{21} & u_{11} \end{bmatrix}. \qquad (8)$$

Thus, the transfer matrix $\overline{U'}$ for A' is shown to be the diagonal transpose of the matrix $\overline{U}$ for element A, as previously stated.

It is noted that in the case where the first splitting device A, together with the reference planes used to define its ports, is invariant for vertical symmetry mirror reflection, its associated transfer matrix has the two off-diagonal elements equal, so that the transposed matrix is the same as the starting matrix. In this case, following equation (8), according to the invention the transfer matrix of the second splitting device A' is simply obtained by pre- and post-multiplication of $\overline{U}$ by [0,1; 1,0] matrices (defined as the 'full transpose', wherein the two elements of the diagonal are swapped and also the the two elements of the off-diagonal are swapped), which is equivalent to doing a mirror reflection with respect to a horizontal axis (A' is up-side-down with respect to A).

Applications of the inventive spatial diversity scheme, as described, include schemes for the hitless reconfiguration of optical components. For hitless reconfiguration of channel add-drop filters, the spatial diversity scheme can be used to switch the entire broadband input signal between one arm that contains the filter, and the other arm that does not, to permit wavelength reconfiguration of the filter without disturbing other wavelength channels during the reconfiguration. The present invention provides hitless switching because the output $c_1$ contains the signal exciting input $a_1$ before, during and after the devices A, A' are actuated in unison to switch light propagation fully from one arm, e.g. 82 in FIGS. 1,2, to the second arm, 84. Then, the filter 86 is free to be reconfigured in any way desired before the signal in the bypass path 84 is redirected back through it, without disturbing the optical spectrum during reconfiguration. For example, the filter may be tuned from one to another wavelength, without affecting any intermediate wavelength channels during the tuning process.

Figure 3:
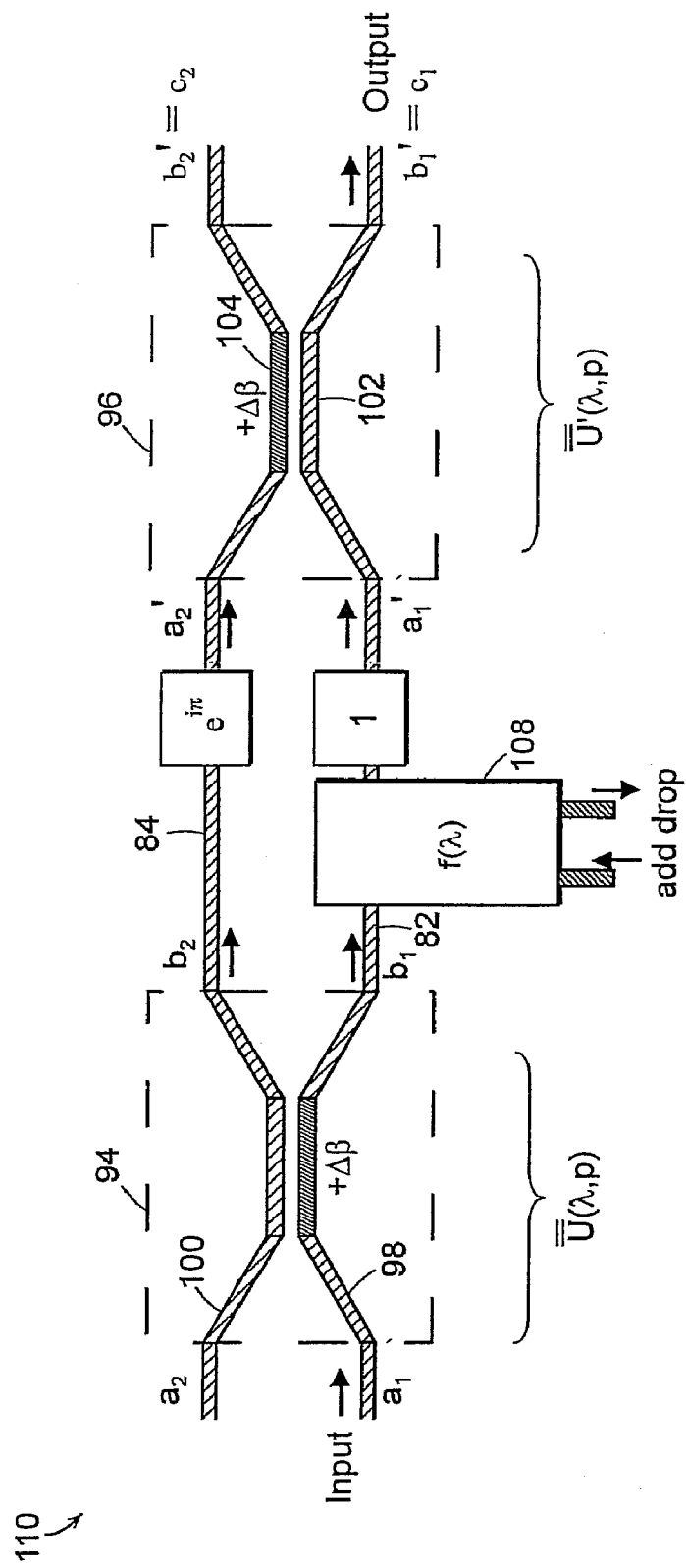
FIG. 3 is a schematic diagram showing a hitless switching scheme, using the spatial diversity configuration, based on $\Delta\beta$-type switches, for hitless bypass switching of optical filters to permit their hitless reconfiguration.

FIG. 3 shows the general schematic of a hitless switch 110 using any type of $\Delta\beta$ switch as elements A and A', such as electro-optic, MEMS-based, or the like. The first element 94 is a $\Delta\beta$ switch (corresponding to block A of FIGS. 1 and 2), where the propagation constants of the bottom 98 and top 100 waveguides (say $\beta_1$ and $\beta_2$, respectively) differ by a user-controllable amount $\Delta\beta_A = \beta_1 - \beta_2$. It will be assumed that the mismatch $\Delta\beta_A$ is set to some value $\Delta\beta$, i.e. $\Delta\beta_A = \Delta\beta$. In the example of FIG. 3, the mismatch $\Delta\beta_A$ is shown to be accomplished by changing the propagation constant of only the bottom waveguide 98 in element 94, but in general the perturbation of one, the other or both waveguides can be employed to achieve the desired effect. A second element 96 is provided that is structurally identical to the switch 94, but according to the invention, it is 180° rotated with respect to first element 94 such that the same magnitude of perturbation $\Delta\beta$ is applied, but to the top waveguide 104 of switch 96. That is, for propagation constants $\beta_3$ and $\beta_4$ associated with the bottom 102 and top 104 waveguides of switch 96, respectively, the mismatch $\Delta\beta_{A'} = \beta_3 - \beta_4$ is set to the negative value $(-\Delta\beta)$ of that of element A ($\Delta\beta$), so that $\Delta\beta_{A'} = -\Delta\beta$, i.e. $\Delta\beta = \beta_4 - \beta_3$. Thus, the $\Delta\beta$ detunings of elements 94 and 96 are opposite. This provides, with the addition of a $\pi$ differential phase shift in the arms 82, 84 connecting the switches, for all light in input $a_1$ to come out in output $b_1'$ (i.e. all light entering input $a_2$ to exit output $b_2'$), in a broadband manner. It is noted that for the optical splitting device A of FIG. 3, a 180° rotation is equivalent to an up-side-down flip, so that the present invention also contemplates that, in case the optical splitting device A is invariant for mirror reflection about a vertical axis (equal off-diagonal elements of transfer matrix), the second optical splitting device A' is the mirror replica of A with respect to a horizontal axis.

By symmetrically actuating the switches (i.e. in unison, $\Delta\beta_A = -\Delta\beta_{A'} = \Delta\beta$), input optical signal is seamlessly transferred between the two arms 82, 84 of the interferometer, while ensuring all light recombines in one output before, during and after the switching operation. By inserting, for example, a tunable optical channel add-drop filter 108 in one arm 82 of the interferometer in FIG. 3, one may accomplish hitless switching of the filter 108. The filter 108, which inserts some response function $f(\lambda)$ into arm 82, should preferably not disturb the designed $\pi$ phase shift difference between the top 84 and bottom 82 arm in the wavelength spectrum of interest (i.e. that which is to be ideally recombined at the output $b_1'$ of the hitless switch), or else any perturbation must be compensated in design. In the case of channel add-drop filters, the spectrum of interest that is to be subject to hitless switching is the set of all wavelength channels other than the resonant channel being added and/or dropped by the filter. During filter operation at a particular wavelength channel all input light is directed through the bottom path 82 by the switches 94, 96. To reconfigure the filter 108, i.e. tune it to another wavelength channel, in a hitless manner one must avoid dropping, even temporarily, any wavelength channel between the current and destination wavelength. Thus, the switches 94, 96 are actuated to transfer all signal to the top arm 84, then the filter 108 is tuned to the new wavelength channel, and the signal is then returned to the bottom arm 82. The output $c_1$ is unaffected at all non-dropped wavelengths during the entire reconfiguration operation. The type of filter 108 may be of any number of types including microring and racetrack-resonator-type filters of any geometry. It may contain any number of other access ports. Shown in FIG. 3 are two customary additional ports—a channel drop and add port.

Standard $\Delta\beta$ switches can be sensitive to fabrication tolerances, particularly in the configuration where the cross-state is to be maximized. Since the inventive design provided works for any 4-port device A, A' that satisfies the constraints described, other types of switch may be used for A, A'. Alternating $\Delta\beta$ switches are known to provide better tolerances with respect to extinction in both the on and off states, and can equally well be used. Mach-Zehnder-interferometer switches may also be used that can be more suitable for switching using the thermo-optic effect.

Figure 4:
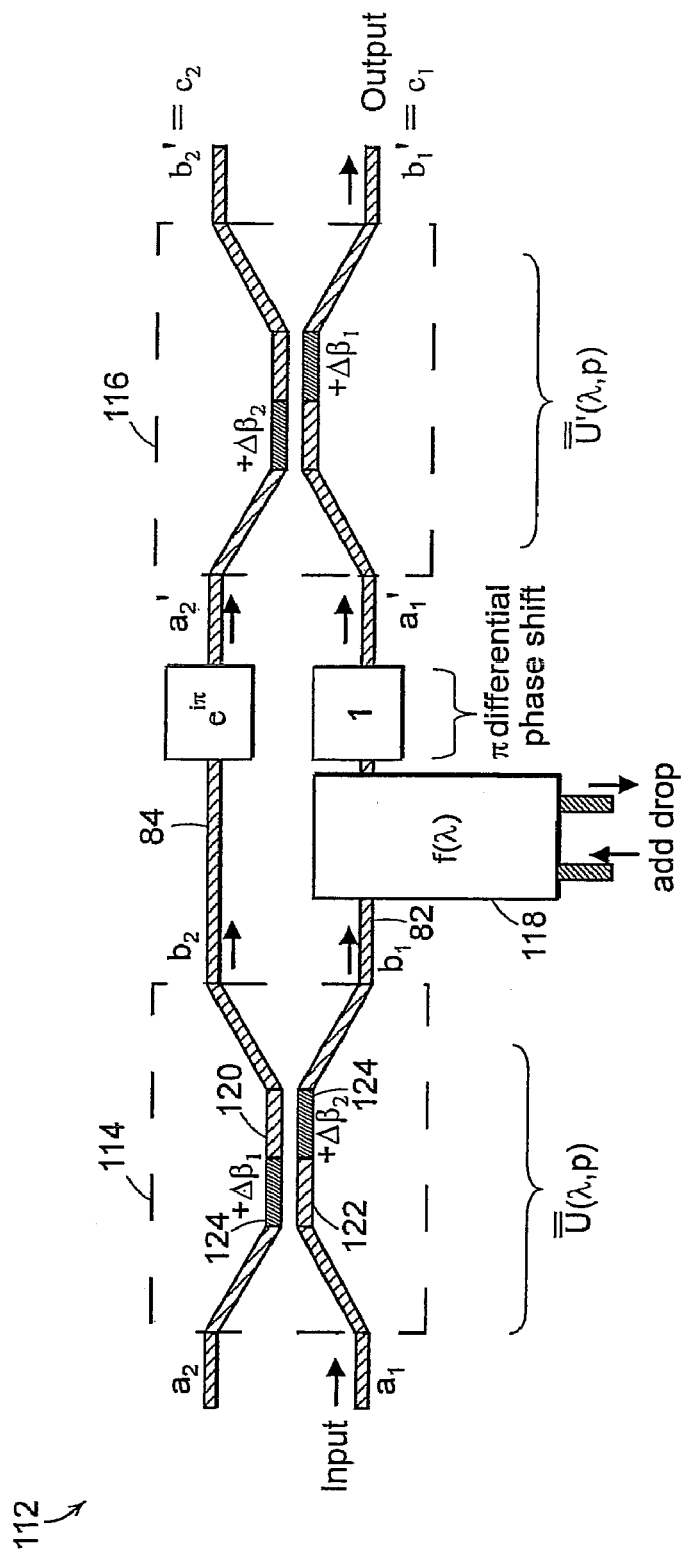
FIG. 4 is a schematic diagram illustrating a hitless switching scheme for optical filters, based on alternating $\Delta\beta$-type switches, which permit improved extinction in both ports over a regular $\Delta\beta$ switch.

FIG. 4 shows the hitless switching scheme 112 with elements 114 and 116 each comprising an alternating-$\Delta\beta$ switch, with a differential $\pi$ phase shift between elements 114 and 116 provided by waveguides 82 and 84, and with a filter 118 in one arm. FIG. 4 shows the most common implementation of alternating-$\Delta\beta$ switch comprising two cascaded sections 120, 122 of directional coupler (though more may be used), each section with a separate, controllable $\Delta\beta$ (labeled $+\Delta\beta_1$, $+\Delta\beta_2$). Although arbitrary lengths of the regions 120, 122 are illustrated and may be employed, preferably the two lengths are equal and $\Delta\beta_1$ and $\Delta\beta_2$ are of equal magnitude, but of opposite orientation—that is, the waveguide lengths 124 are perturbed identically. This permits the $\Delta\beta$ switches to switch from 0 to 100% even if the coupling length fabricated is in error. Otherwise, the hitless switching scheme works identically to that in FIG. 3. It is noted that the optical splitting device A' of FIG. 4 is obtained by a 180° rotation of the splitting device A.

Figure 5:
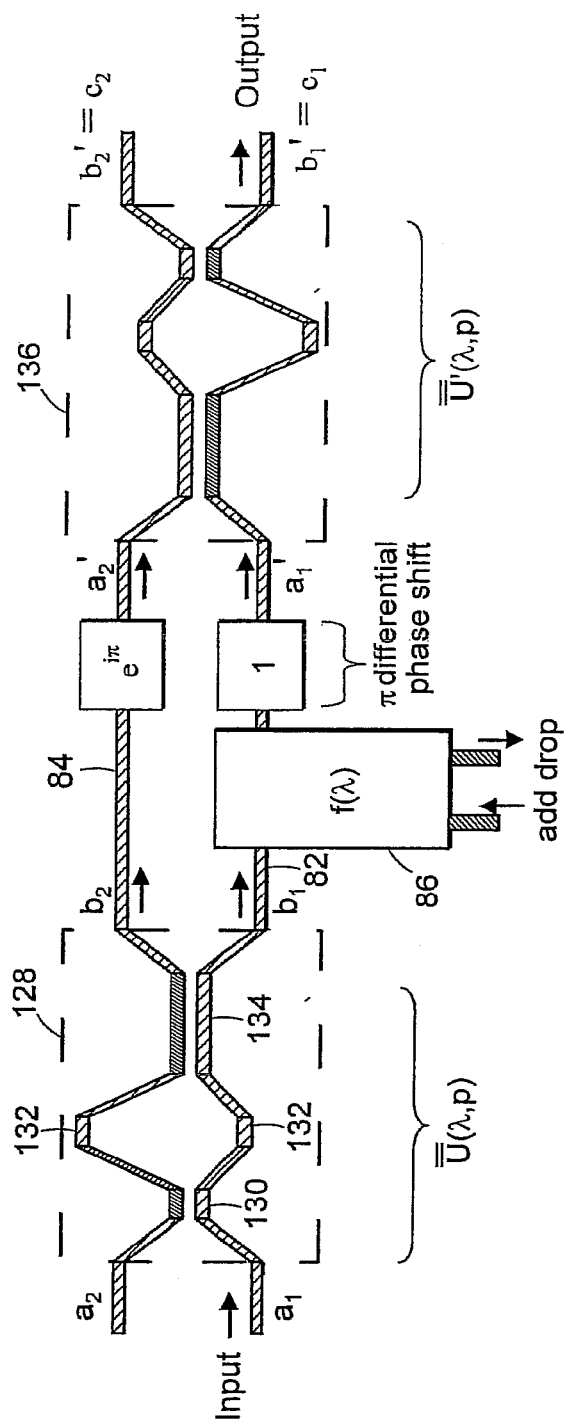
FIG. 5 is a schematic diagram illustrating a hitless switching scheme for optical filters, based on broadband coupler designs using two unequal length couplers in a Mach-Zehnder configuration for each of the splitting and recombining elements.

While any wavelength dependence of switches A and A' of FIGS. 1 and 2 does not affect the hitless output $c_1$, it does affect the power splitting in the waveguide arms 82 and 84. Thus, the bandwidth of the optical element A and A' sets the usable wavelength range for the reconfigurable filter or other optical device 86 in the arms 82. Broadband switches for optical elements A and A' are desirable. Broadband waveguide coupler designs for A, A' can also be incorporated into the inventive spatial diversity scheme, as shown in FIG. 5, to provide a broad usable spectrum for the hitless-switched device 86. FIG. 5 illustrates broadband coupler element 128, comprising a directional coupler 130 of one length, followed by a pair of uncoupled waveguides 132 and a second directional coupler 134 of a different length. The lengths of the first 130 and second directional coupler 134 and the length difference of the uncoupled intermediate arms 132 in such an interferometer can be designed to produce a wavelength-insensitive directional coupler 128 with a particular desired splitting ratio. The second broadband coupler 136 is structurally identical to 128, but rotated 180 degrees in FIG. 5, as required by the spatial diversity scheme described herein. In order to convert the static broadband coupler into a broadband switch suitable for the hitless switching scheme, the broadband couplers 128 and 136 can be designed for full transfer (broadband 100% cross-state power transfer to waveguide 84), and switches based on $\Delta\beta$, such as those shown in FIG. 3, can replace the simple directional couplers 130 and 134 of the broadband optical coupler 128, as indicated by the black marked waveguides. The coupler 136 is likewise made structurally identical and 180° rotated with respect to coupler 128.

When no $\Delta\beta$ actuation is applied, the directional couplers 130, 134 are identical to those of the static broadband coupler and all light is transferred across to the cross-state waveguide 84 (e.g. from $a_1$ to $b_2$). When a $\Delta\beta$ perturbation is applied to each coupler 130 and 134, broadband coupler 128 may be tuned to bring transfer to a null. Because the transfer is identically zero for only particular values of detuning, wavelength dependent coupling can mean that one does not disable the coupling fully at all wavelengths. However, if a large $\Delta\beta$ detuning can be applied, the transfer goes invariably toward zero. Thus, with a large $\Delta\beta$ detuning a broadband on and off state can be achieved. Use of such broadband switches as elements 128 and 136, with element 136 structurally identical to element 128, and identically actuated, but in 180-degree-rotated orientation with respect to 128, as required by the invention, permits broadband hitless switching.

A $\pi$ differential phase shift is required. An optical functional device 86 such as a filter is included in at least one of the intermediate waveguide arms 82, 84. Note that the switches 128 and 136 need to be broadband for the wavelength range of interest only in the on and off states—the splitting ratio in the intermediate states may be wavelength dependent because the geometry of the spatial diversity scheme, with element 136 rotated by 180 degrees with respect to element 128 and with the $\pi$ phase shift, guarantees broadband perfect recombination of the input light in the output, irrespective of the wavelength dependence of elements 128 and 136. And, the broadband character of the switches 128, 136 in the case of a hitless bypass application for optical filters is only of interest in the fully-coupled state to either the filter waveguide arm 82 (during normal filter operation) or to the second bypass waveguide arm 84 (during filter reconfiguration).

Figure 6:
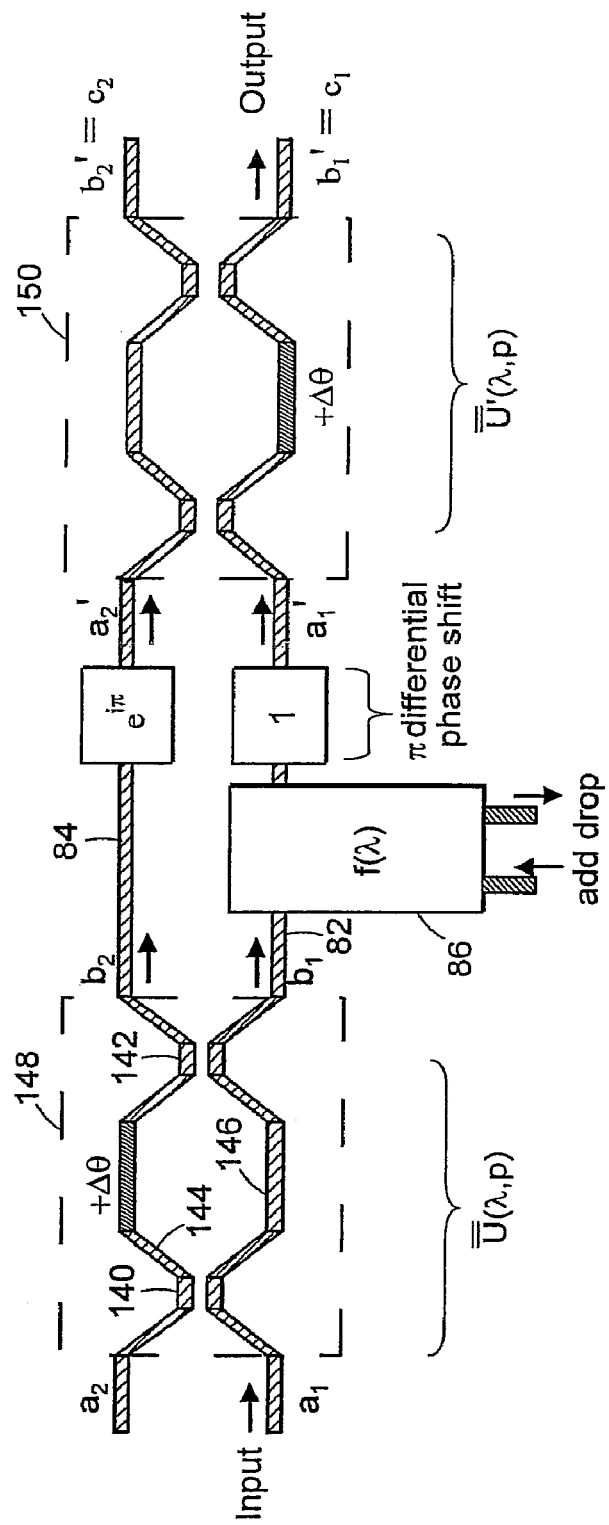
FIG. 6 is a schematic diagram illustrating a hitless switching scheme for optical filters, based on Mach-Zehnder-interferometer-type switches.

FIG. 6 shows another embodiment of the present invention, using a Mach-Zehnder interferometer (MZI) based switch 148, comprising two 3 dB couplers 140, 142 connected by a pair of uncoupled waveguides 144, 146 with a controllable phase difference (labeled $\Delta\theta$). The phase difference $\Delta\theta$ may be generated by starting with a balanced MZI, (having equal-length arms 144, 146), and using the thermo-optic or electro-optic effects, or MEMS-actuated dielectric perturbation of the waveguide, to change the propagation constant in one arm (e.g. 144). The phase $\Delta\theta$ is the change in the propagation constant in that arm 144, times the length of the perturbed section of the arm. A $\pi$ phase change in $\Delta\theta$ causes full switching of the input light from one port to the other. All other features of the hitless switching scheme (180-degree-rotated orientation of element 150 with respect to element 148 in the sense defined earlier and a $\pi$ differential phase shift between elements 148 and 150) are the same as in the previously described examples. It is noted that also for the MZI-based device A of FIG. 6, having identical couplers, a 180° rotation is equivalent to an up-side-down flip, so that the present invention also contemplates that, in case the optical splitting device A is invariant for vertical mirror reflection (equal off-diagonal elements of transfer matrix), the second optical splitting device A' is the mirror replica of A with respect to a horizontal axis.

One advantage of the MZI-based switches is that they are particularly suitable for switching using the thermo-optic effect, which is weak and thus difficult to use for $\Delta\beta$-type switches. Larger arm lengths permit small thermo-optic material index changes to permit a sufficient phase $\Delta\theta$ to accumulate. This example shows an arbitrary filter device 86 in one of the two waveguide arms 82.

Thermo-optically-actuated, cascaded MZI-based switches for hitless switching of filters are known in prior art. Those approaches employ configuration where elements 148 and 150 are not 180° degree rotated in orientation or reflected about a horizontal axis with respect to one another as according to the present invention design, and do not require a π phase shift difference to be imposed by the two arms 82, 84 connecting the elements 148 and 150 or 128 and 136, but rather use balanced, i.e. zero phase shift, configuration. These configurations, with identically oriented switches 148 and 150 connected by balanced arms, work only with the limited set of signal splitting switches for which a pair of output reference planes can be found such that exactly 0 or π phase difference between the two outputs is maintained for excitation from one input, for all wavelengths in the spectrum of interest and for all settings of the switch. MZI switches using ideal 3 dB couplers at all wavelengths would be in this category, and hence would permit the cited schemes to work over a wavelength range where the MZI has substantially ideal 3 dB couplers.

The designs of the present invention show the following advantages. First, they allow a spatial diversity scheme with complete recombination of the signal from one input waveguide into one output final waveguide for all 2-input, 2-output low-loss optical signal splitting/recombining devices A, A' (e.g. switches), even if those devices A and A' do not guarantee 0 or π phase difference between the two outputs for all states, and/or the phase difference changes with wavelength or depending on the state of the switch. This more general case includes $\Delta\beta$ switches and resonant filters. Secondly, MZI switches with couplers which deviate from the ideal 3 dB condition will not yield perfect recombination of all input light in the cited schemes, and thus fabrication errors in creating the couplers will result in non-ideal recombination. Further, wavelength dependence of couplers means that they generally are not 3 dB at all wavelengths. This would further deteriorate, in the intermediate and in some cases also the final states of the switches A and A', the complete, hitless recombination in the output port (port $c_1$ in FIGS. 1,2) of prior art designs.

The scheme of the present invention, which requires that switches 148 and 150 be in opposite orientation as described (i.e. actuated at opposite sides—top for 148 (A), bottom for 150 (A')—in this example, FIG. 6), and be connected by a pair of waveguides with a differential π phase shift, guarantees complete recombination of input light ($a_1$ in FIG. 6) at the output ($a_2'$ in FIG. 6). Thus, the present invention scheme has the advantages that recombination of all light into the final output ($a_2'$ in FIG. 6) is insensitive to fabrication errors (so long as they symmetrically affect the identical splitting 148 and recombining 150 elements), and more importantly to any wavelength dependence of the MZI couplers. The scheme is thus inherently broadband for the through-passing optical signals (those destined to pass through the diversity switch, e.g. from $a_1$ to $a_2'$), and fabrication tolerant. The wavelength independent character of the signal recombination (to $a_2'$) function of the inventive design depends only on the wavelength-independence of the particular realization of the differential π phase shift in the arms.

Figure 7:
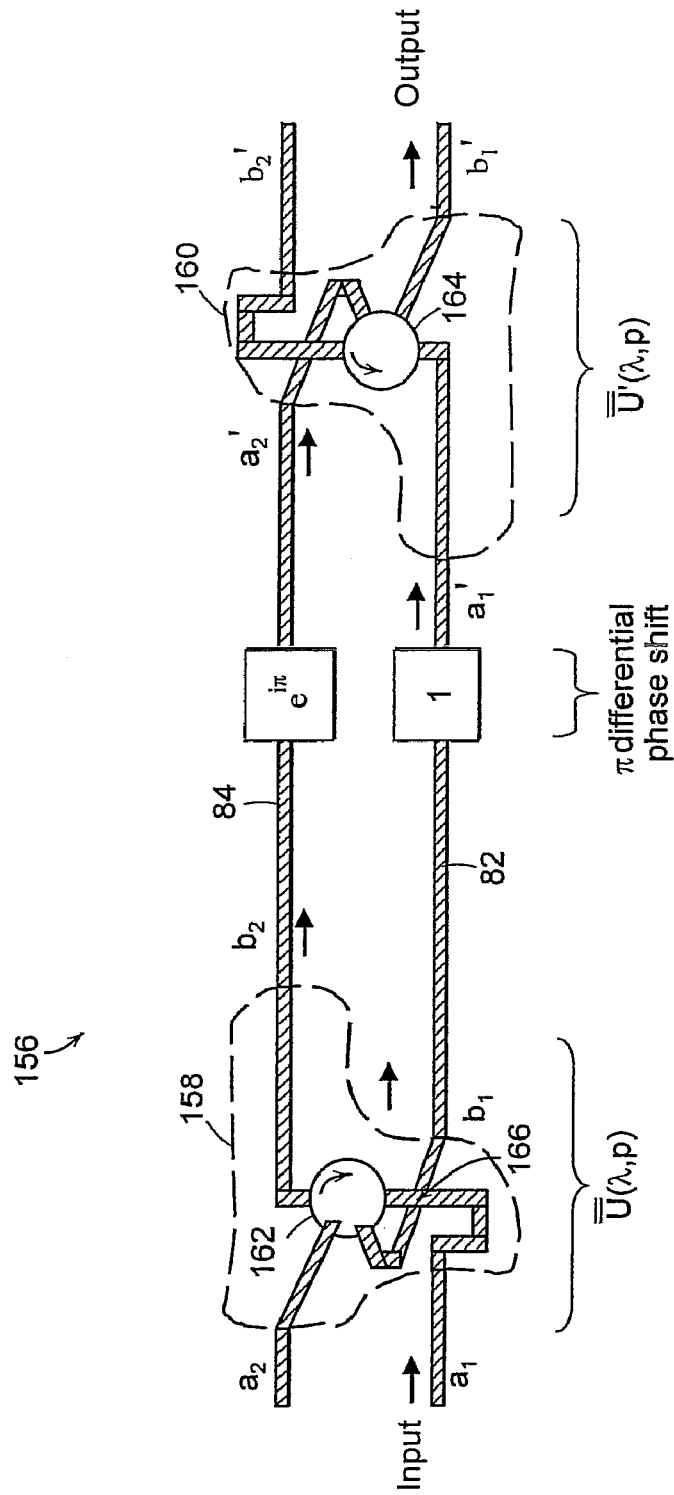
FIG. 7 is a schematic diagram illustrating a proof-of-principle example of a spatial diversity scheme using coupling elements A and A' that incorporate a non-reciprocal device.

FIG. 7 illustrates a proof-of-principle device 156 example which shows how the scheme works with non-reciprocal devices. The devices 158 and 160 are of identical geometry, and each contains a respective circulator 162, 164, a non-reciprocal device. In this case, devices or elements 158 and 160 are structurally identical except for the orientation of the magnetic material dipoles (and thus any applied DC magnetic fields), which is opposite in the two cases such that the circulator in element 160 operates in the reverse direction to that of 158. The circulators 162, 164 and the waveguide crossings 166, 168 in elements 158, 160, are assumed to be of substantially low loss. A simple geometry is chosen so that one can see by inspection that a signal entering port $a_1$ exits port $a_2'$, as required by the inventive technique. This would not be the case without reversing the direction of the circulators, 162, 164. Thus one can show that the inventive scheme is consistent with this example. In the case illustrated in FIG. 7, signal entering port $a_1$ of 158 traverses the bottom waveguide arm 82, before exiting port $a_2'$ of 160. If the direction of the circulators can be reversed by reversing the direction of each applied bias magnetic field, then the signal entering $a_1$ traverses the top arm 84 before exiting port $a_2'$. If, in addition, intermediate states of such a "circulator switch" A all ensure that all optical power exits in ports b, or $b_2$, then the overall scheme provides that all input $a_1$ is recombined at output $a_2'$ for all states, giving a hitless switch in similar way to the previous examples. Arbitrary non-reciprocal devices may be used as part of elements 158, 160 so long as they satisfy the requirements for the scheme set out herein.

In the following, the hitless switching scheme described in FIG. 3 is revisited in greater detail, including: a demonstration that the coupled-mode theory model of $\Delta\beta$ switches gives consistent results with the general matrix formalism already described; discussion of the preferable operating states of $\Delta\beta$ switches; effect of deviation from ideal π phase shift on bandwidth of the general inventive scheme; example approaches to physical implementation of the π differential phase shift; and example realizations of $\Delta\beta$ switches using MEMS actuation. FIG. 8B shows the reconfiguration scheme based on $\Delta\beta$-type switches that is, by symmetry, hitless and broadband in its recombination of signal entering input $a_1$ at the hitless output $b_1'$. The scheme involves two cascaded $\Delta\beta$ switches 172, 174 where the inputs of the second switch are reversed with respect to the inputs of the first switch; and, a π differential phase shift is introduced between the two arms 176, 178. For hitless operation, the two switches must be identically actuated. The hitless recombination operation, to the hitless output $b_2'$, of the scheme proposed is as broadband as the π phase shift introduced, irrespective of the bandwidth of the switches.

Figure 8A:
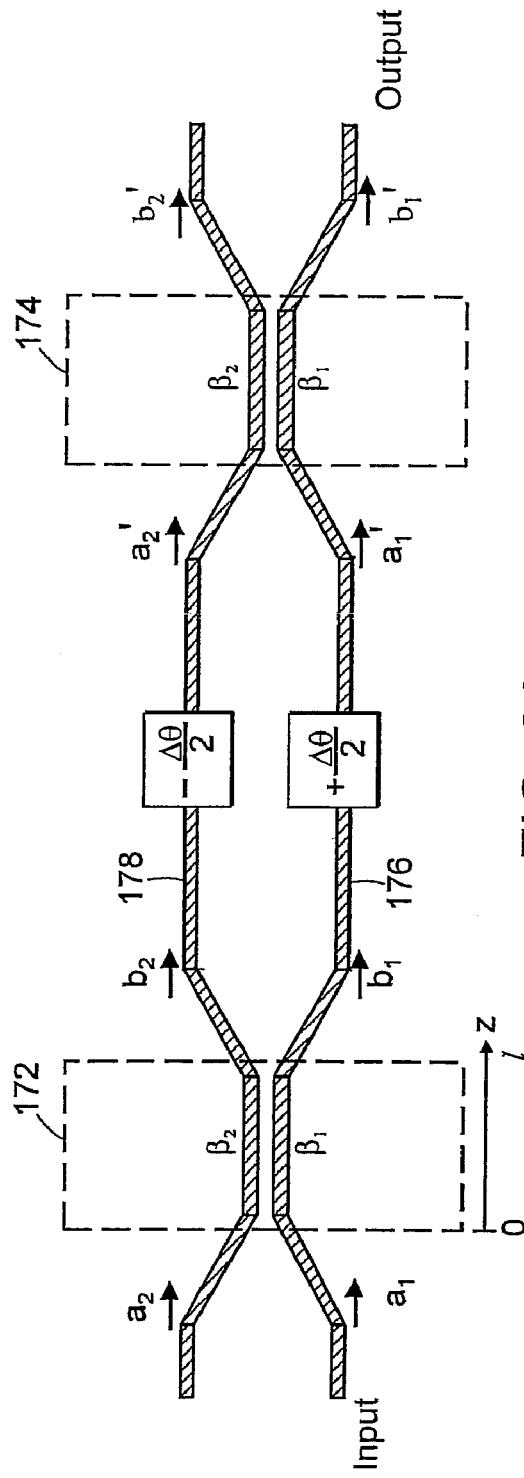
FIGS. 8A-8B is a schematic diagram illustrating a spatial diversity scheme using $\Delta\beta$ switches and a differential $\pi$ phase shift.
Figure 8B:
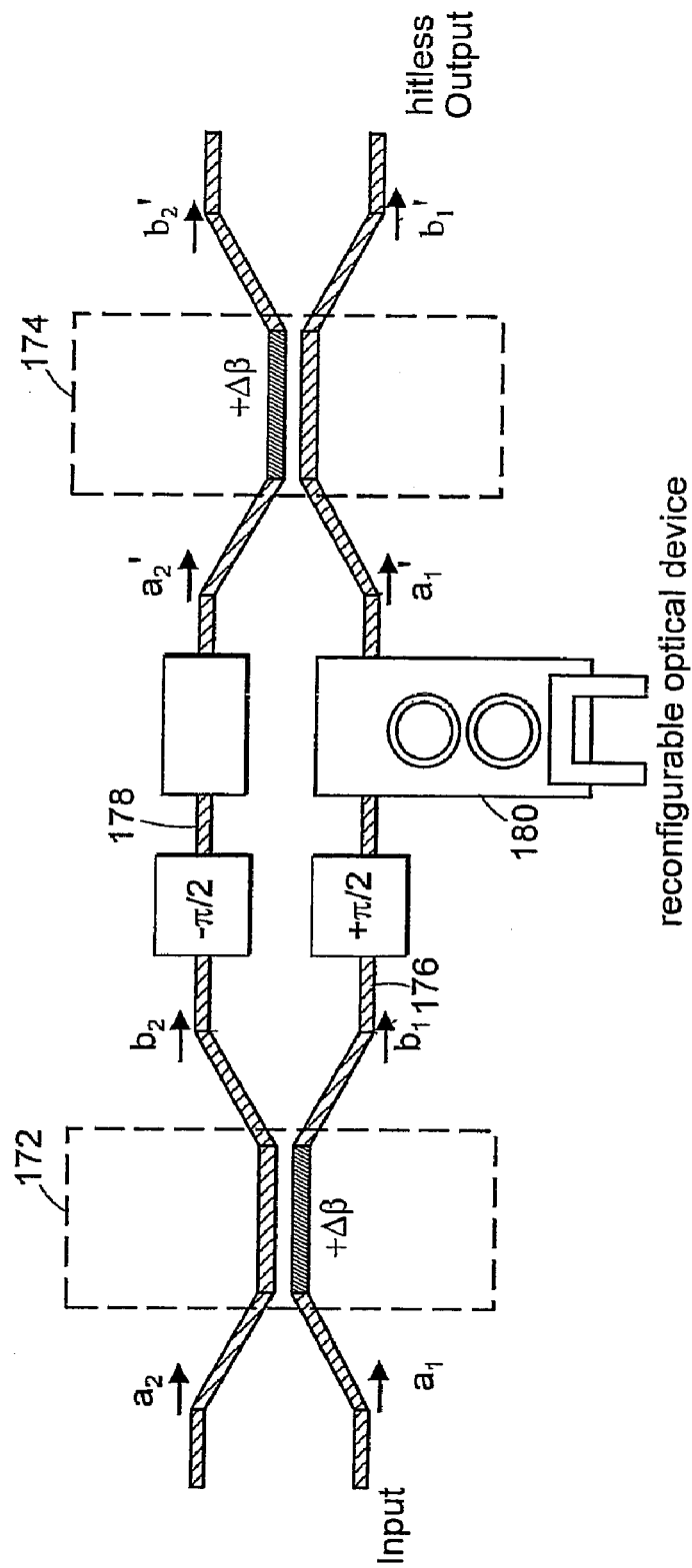

FIG. 8A shows a schematic of the spatial diversity scheme configuration, where arms 176, 178 that connect couplers 172, 174 have identical lengths except for a respective deviation in phase of $\pm\Delta\theta/2$, thus accumulating a phase difference between the arms of $\Delta\theta$. FIG. 8B shows an embodiment of the hitless switching scheme using $\Delta\beta$ switches, having one arm 176 of the interferometer containing the device 180 to be reconfigured, such as a wavelength-tunable channel add/drop filter, while the other arm 178 is free. Note that each arm 176, 178 provides a respective phase difference of $\pm\pi/2$. The filter 180 does not affect channels at off-resonant optical frequencies, and the arm path lengths are equal, save for a potentially introduced phase shift in the filter arm, e.g. by the presence of the filter modifying the waveguide propagation constant. In the absence of the filter 180, if the switches are set at zero or full transmission, all of the input signal ($a_1$) arrives at the output ($b_1'$).

A single Δβ-type optical switch is based upon a directional coupler, where power transfer is governed by the strength of evanescent coupling and a controllable propagation constant mismatch. The couplers 172, 174 of the interferometer can be described by the solutions of the coupled-mode equations, $$\frac{\partial}{\partial z}\overline{u} = -j\begin{bmatrix} \delta & \kappa \\ \kappa^* & -\delta \end{bmatrix}\overline{u} \quad (9)$$

where $u_{1,2}$ are the guided mode envelope amplitudes in the two waveguides, normalized so that power in each guide is $|u_{1,2}|^2$. Here, $\overline{\beta} \equiv (\beta_1+\beta_2)/2$, $\delta \equiv (\beta_1-\beta_2)/2 = \Delta\beta/2$ is the propagation constant mismatch between the two waveguides, and $|\kappa|$ is the strength of evanescent coupling. Free choice of normalization allows $\kappa = \kappa^*$, real. The solution for propagation through a distance l is found as (convention: j=−i, where $j^2 = i^2 = -1$)

$$\begin{bmatrix} b_1 \\ b_2 \end{bmatrix} = \begin{bmatrix} re^{-j\phi} & -jt \\ -jt & re^{+j\phi} \end{bmatrix}\begin{bmatrix} a_1 \\ a_2 \end{bmatrix} \quad (10)$$

where r, t, φ are real, $\overline{a} \equiv \overline{u}(z=0)$ are the incident waves and $\overline{b} \equiv \overline{u}(z=l)$ are the transmitted waves, and $$re^{-j\phi} = \cos(\sqrt{\kappa^2+\delta^2}\,l) - j\frac{\delta}{\sqrt{\kappa^2+\delta^2}}\sin(\sqrt{\kappa^2+\delta^2}\,l)$$

$$t = \frac{\kappa}{\sqrt{\kappa^2+\delta^2}}\sin(\sqrt{\kappa^2+\delta^2}\,l).$$

Note that $r^2+t^2=1$, and that transfer is controlled only by κl and δ/κ. Now consider the interferometer formed by coupler 172, two waveguides 176 and 178 dephased by ±Δθ/2, and a second coupler 174, as shown in FIG. 8A. The net transfer matrix is $$\overline{\overline{T}} = \begin{bmatrix} r_a r_b e^{-j(\phi_a+\phi_b+\Delta\theta/2)} - t_a t_b e^{j\Delta\theta/2} & -j(t_a r_b e^{-j(\phi_b+\Delta\theta/2)} + t_b r_a e^{j(\phi_a+\Delta\theta/2)}) \\ -j(t_b r_a e^{-j(\phi_a+\Delta\theta/2)} + t_a r_b e^{j(\phi_b+\Delta\theta/2)}) & r_a r_b e^{j(\phi_a+\phi_b+\Delta\theta/2)} - t_a t_b e^{-j\Delta\theta/2} \end{bmatrix} \quad (11)$$

Hitless operation requires that two elements of the matrix remain at unity magnitude at all times during reconfiguration, i.e. at all, including intermediate, settings of the Δβ switches. It is desirable to make the switches identical and actuated in unison, to improve tolerability to fabrication errors and simplify control. In this case, $r_a = r_b \equiv r$, $t_a = t_b \equiv t$. During the actuation of the switches, r, t, $\phi_a$ and $\phi_b$ change. For the switch to operate as desired and guarantee hitless transfer of power from one arm to another, two features are required: the inputs of second coupler b must be reversed relative to first coupler a, so that $\phi_a = -\phi_b \equiv \phi$, and a differential phase shift of π radians in the intermediate arms must be introduced (i.e. Δθ=π). Observing the form of the transfer matrix of the first switch in equation (10), this requirement is seen to be consistent with the earlier stated requirement that the second switch have a transfer matrix that is the diagonal transpose of that of the first switch. Note that equation (10) is the particular case of transfer matrix with off-diagonal elements equal.

The result, seen from equation (11), is that matrix elements $T_{11}$ and $T_{22}$ have unity magnitude, while the other two are zero, in all states of the compound switch. On the other hand, the operation changes the fraction of total power in waveguide 176 as $r^2$.

Figure 9A:
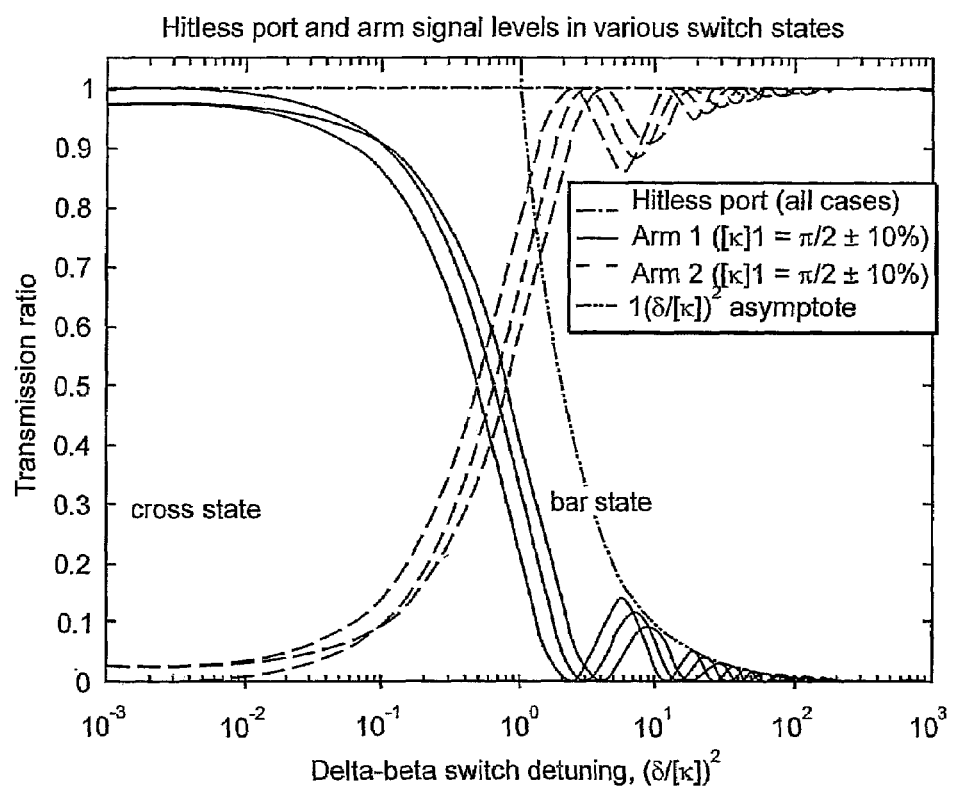
FIG. 9A is a graph demonstrating the hitless switching performance of the spatial diversity scheme using $\Delta\beta$-type switches for elements A and A'.

To further enable full transfer of power between one arm and the other, κl=π/2, and δ/κ which controls the switching, varies from 0 for full transfer to $\sqrt{3}$, higher nulls, or asymptotically high values for null transfer. FIG. 9A shows the total output and power in each waveguide vs. detuning δ/κ. Moreover, FIG. 9A shows that if the coupling strength and coupling length are not fabricated to give precisely 100% transfer in the cross state for zero Δβ (which here means δ=0), then the switch cannot fully direct the light from one path 176 to another 178, and vice versa and the filter in one arm will always affect at least a small part of the signal, causing "hit loss". Further, if designed for 100% cross-state transfer at one wavelength, the coupler can have wavelength dependence and thus full transfer may not achieved over the entire spectrum of interest. It should be noted that none of these issues affect the perfect recombination of all input light in the final output at all wavelengths—they affect only the input splitting and switching between the intermediate arms 176, 178. However, more advanced switch designs can correct for these problems.

To form a hitless switchable device, the device 180 is inserted in one arm of the described switch, such that it does not disturb the phase of those signals that are to be switched in a hitless manner. For a channel add/drop filter, these signals would be the adjacent/express channels.

Ideal operation of the switch, taken to mean that all input signal can be ideally recombined at the output, depends only on lossless (or substantially low loss) operation of the Δβ switches, their antisymmetric arrangement and symmetric actuation, and the introduced π phase differential. FIG. 9A shows that regardless of the state of the switch, the (hitless) output port contains all of the input light in the absence of additional devices (180) in either of the arms. This property does not depend on the details of the Δβ switch.

Figure 9B:
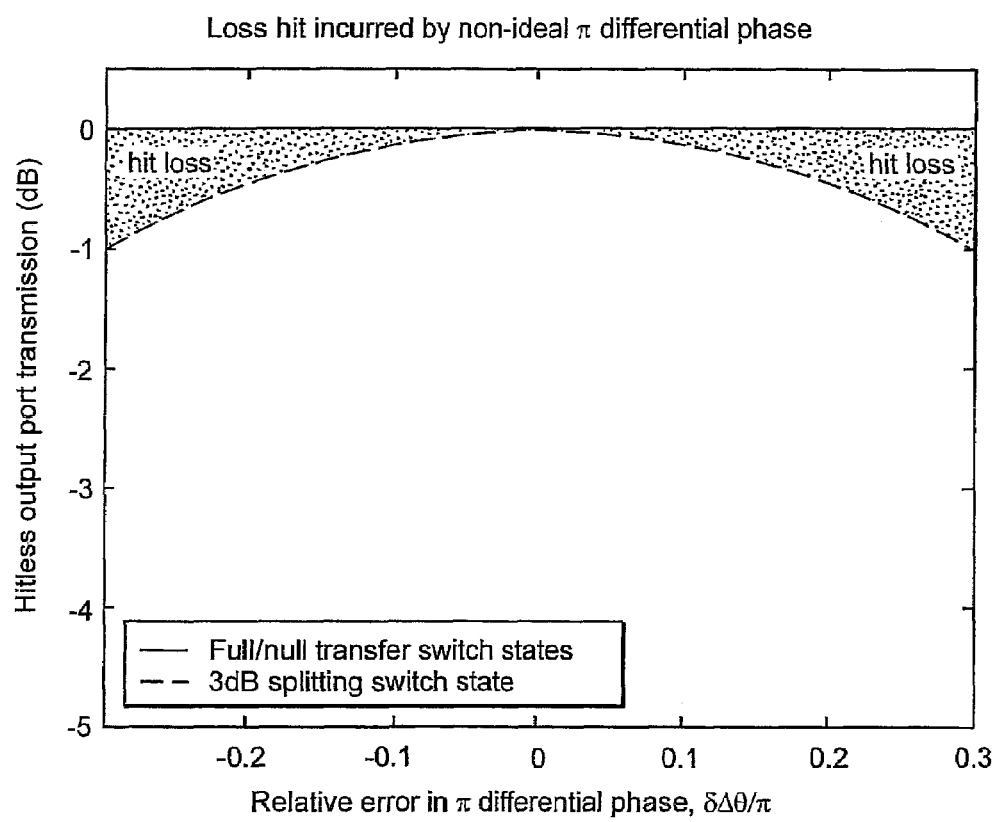
FIG. 9B is a graph illustrating the total output response of the device of FIGS. 1,2, versus fractional error in the $\pi$ differential phase shift.

The character of the function to recombine all input light at one output of the proposed hitless switching scheme is broadband independent of the frequency dependence of the constituent switches, and depending only on the bandwidth of the required π phase shift, which depends on the particular realization chosen for the shift. FIG. 9B shows the range of insertion loss values that the recombined output port of the hitless switch may take on during a switching operation, for various values of phase error with respect to an ideal π phase shift. In the full or null transfer states, all light traverses one arm and the π shift is irrelevant. The 3 dB state is most sensitive and can incur a 1 dB hit for 30% error in the phase shift. This still permits bandwidths in the hundreds of nm to be realized.

Figure 10:
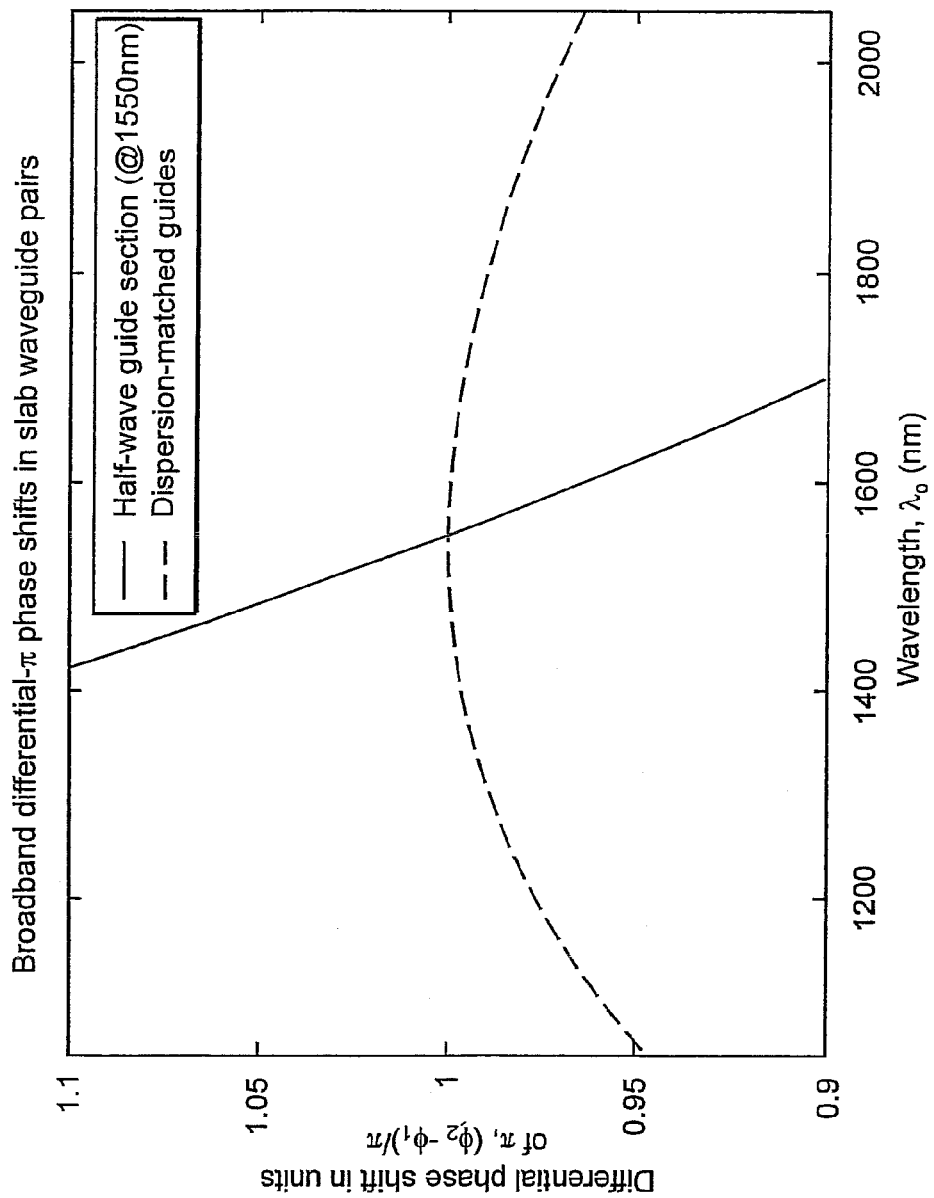
FIG. 10 is a graph demonstrating the differential phase shift vs. wavelength, for two exemplary physical waveguide-pair designs for generating a broadband $\pi$ phase shift.

To realize a hitless switch of this kind, one can consider some physical realizations of Δβ switches and the π phase shift that were idealized in the presented model. One first addresses the phase shift. The simplest realization is a half-guided-wavelength (at center-band) extra-length of waveguide section, e.g. in arm 176 relative to arm 178. The guided wavelength of the propagating mode is related to its propagation constant $\beta$ as $\lambda_{guide}=2\pi/\beta$. A half guided-wavelength is equivalent to a $\pi$ phase shift. Waveguide dispersion causes the phase shift to vary with wavelength, but the short length guarantees a reasonably large bandwidth. For example, identical cross-section slab waveguide arms with core index 2.2, cladding index 1.445 and thicknesses of 0.5 µm (TE) give less than 5% deviation in the $\pi$ shift over 140 nm bandwidth, as shown in FIG. 10, which corresponds to a negligible "hit" loss, as shown in FIG. 9B.

For wider bandwidths or lower hit loss, the dispersion of the waveguides in the two interferometer arms may be engineered by using non-identical cross-sections. If the two waveguides 1 and 2, i.e. 176 and 178 in FIGS. 8A,B, have lengths $L_1$ and $L_2$, then in the ideal case, $\beta_1(\omega)L_1-\beta_2(\omega)L_2=\pi+2\pi m$. In a band of interest near $\omega_o$, a first-order Taylor-series expansion of $\beta(\omega)$ in frequency detuning $\delta\omega$ yields two requirements:

$$\beta_1(\omega_o)L_1 - \beta_2(\omega_o)L_2 = \pm\pi + 2\pi m \quad (12)$$

$$\frac{\partial \beta_1}{\partial \omega}\bigg|_{\omega_o} L_1 - \frac{\partial \beta_2}{\partial \omega}\bigg|_{\omega_o} L_2 = 0 \quad (13)$$

Such waveguide designs are realizable. For example, a pair of slabs as above, this time of identical length $L_1=L_2=6.5$ µm, but widths of 0.5 µm and 0.91 µm, yields a differential $\pi$ phase shift within 5% over more than 900 nm, as shown in FIG. 10. However, with guides of non-identical design, loss in the two arms (e.g. sidewall roughness loss) can be different and cause imbalance in the switch. Care is required in design to ensure balanced arm losses. For short-length waveguides this should not pose a problem. A second issue is that the device 180 inserted into the switch, such as a channel add/drop filter, may alter the phase balance. If the device adds phase and dispersion over the wavelength range that requires hitless operation, it must be compensated by design in the second arm (by altering the design of that waveguide or inserting a designed phase-compensating device) to restore the $\pi$ shift. In the case of a ring-resonator filter (shown, examplarily in FIG. 8B) non-resonant channels, i.e. those to be hitlessly switched, are not affected by the ring, with the exception of a possible broadband phase increment (due to modification of the waveguide 176 propagation constant by the ring filter where they are in close proximity), which may be compensated.

The implementation of a $\Delta\beta$ switch is typically electro-optic. MEMS-actuated switches based on dielectric perturbation can provide fast, strong perturbation enabling small-footprint switches. Here, a high-index-contrast (HIC) waveguide switch is presented with MEMS-actuated dielectric slab $\beta$ perturbation. HIC enables compact-footprint photonic components. Due to the exponentially vanishing evanescent field of a guided mode, for a particular waveguide, short, strong couplers are more broadband than long, weakly-coupled ones. To maintain $\kappa l=\pi/2$ in a short coupler, strong coupling $\kappa$ is required. For switching to be achieved, therefore, large $\Delta\beta$ is also required.

Figure 11A:
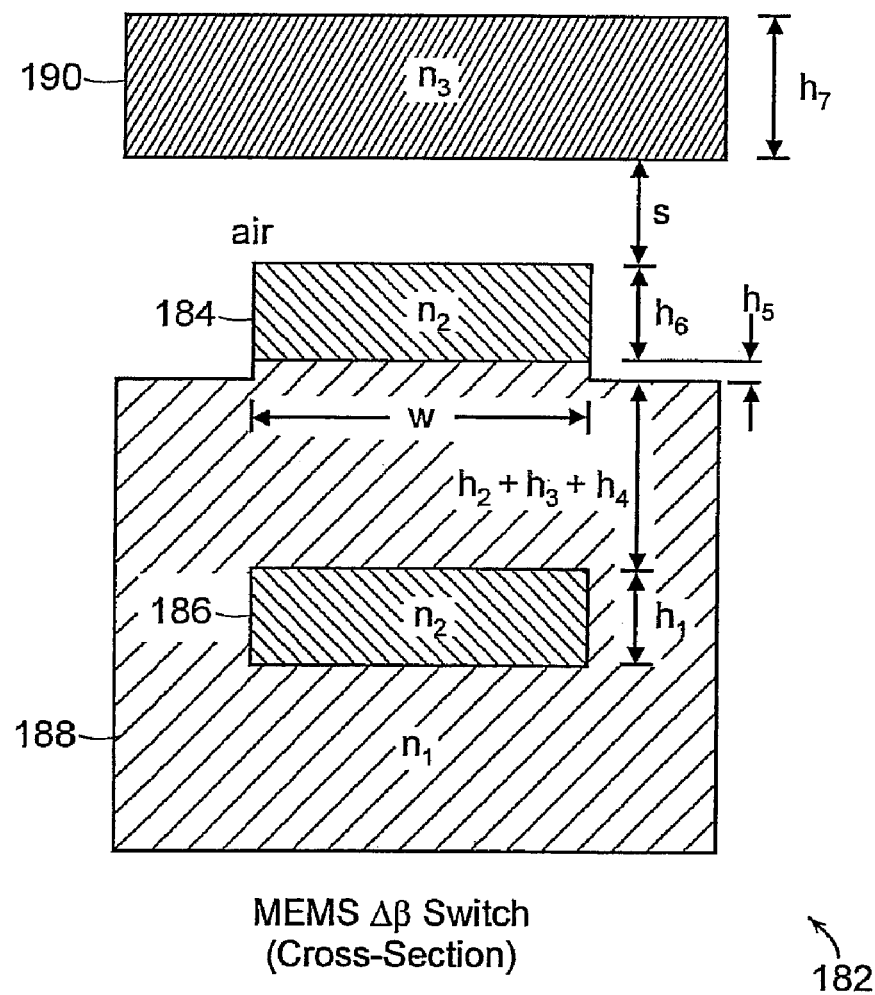
FIG. 11A illustrates a MEMS-based $\Delta\beta$ switch and FIG. 11B shows a graph demonstrating the performance of the switch.

In the following example, operation of one such switch is described, in a vertical geometry where the coupler waveguides 184, 186 are in different lithographic layers and the slab 190 moves up and down, as shown in FIG. 11A. The $\Delta\beta$ switch is formed in a waveguide environment with two high-refractive-index vertically separated waveguide core layers 184, 186 embedded in a lower index cladding material 188, as indicated by the cross-section 182 of the switch. The directional coupler is formed from the vertically spaced pair of parallel waveguides 184, 186. Dielectric slab 190 that interacts with the evanescent field of top waveguide 184 and can be physically moved by a MEMS assembly vertically into proximity or contact with waveguide 184 can provide strong $\Delta\beta$ perturbation.

Figure 11B:
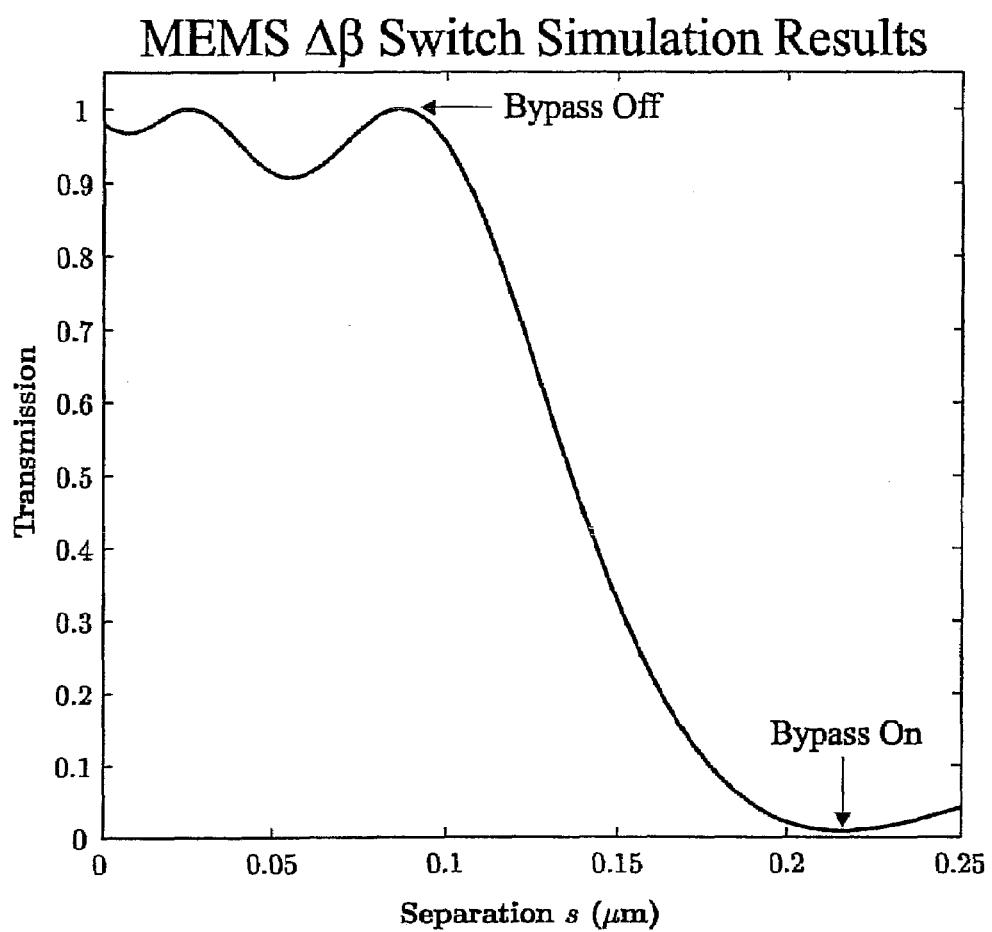

In addition to a strong $\Delta\beta$ detuning due to the effective index change induced in the top waveguide 184 by the lowered high-index dielectric slab 190, the slab also "pulls" the guided mode of the top waveguide closer waveguide toward it, thus also reducing the coupling $\kappa$ and further increasing the $\delta/\kappa$ ratio that is relevant for switching. Eigenmode-expansion-method simulation results showing the bar-state transmission (fraction of light entering bottom waveguide 186 that stays in that waveguide) as a function of the slab separation s are depicted in FIG. 11B. In the particular implementation used for the simulation the dimensions and indices were set to $h_1=0.28$ µm, $h_2=0.28$ µm, $h_3=0.28$ µm, $h_4=0.19$ µm, $h_5=0.1$ µm, $h_6=0.33$ µm, $h_7=0.4$ µm, w=1.05 µm, $n_1=1.445$, $n_2=2.2$, and $n_2=1.72$.

Figure 12:
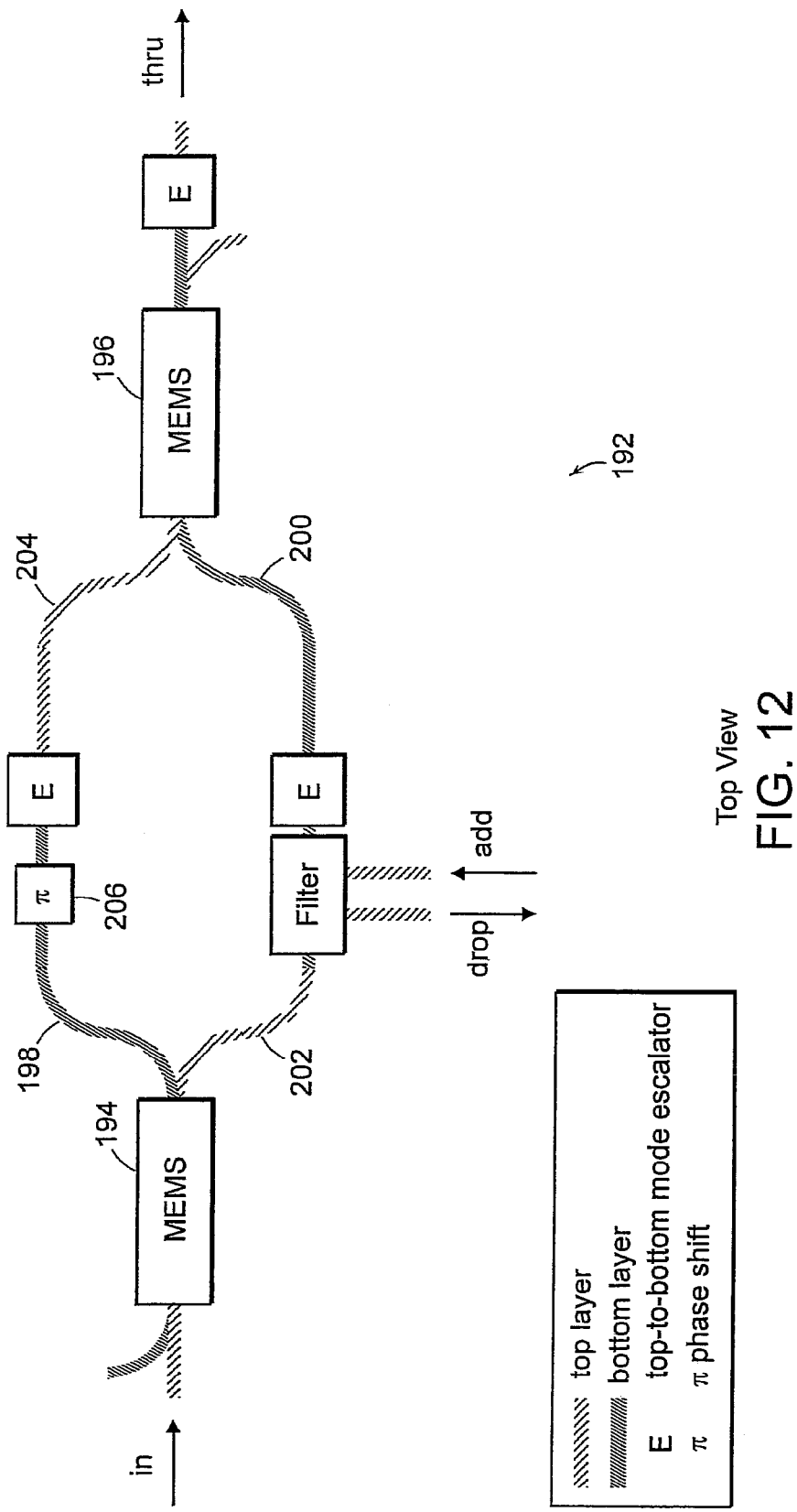
FIG. 12 is a schematic diagram illustrating a particular implementation of the spatial diversity scheme for hitless switching utilizing a pair of MEMS-based $\Delta\beta$ switches with vertical actuation.

Embodiment variants of the hitless switch scheme provided by the present invention are demonstrated using the vertical MEMS-based $\Delta\beta$ switches of FIG. 11. The top view of a symmetric hitless switch design 192 is shown in FIG. 12, with MEMS-actuated $\Delta\beta$ switches 194, 196. Equal lengths 198, 200 and 202, 204 in each waveguiding layer 184 (top) and 186 (bottom), respectively, of the two waveguide arms will ensure a balanced interferometer (before the $\pi$ phase shift 206 is added). With such a geometric arrangement, an equivalent folded geometry embodiment, shown in FIG. 13, may then be used to provide the symmetric MEMS $\Delta\beta$ actuation where one MEMS slab 210 acts over both the input 212 and output 214 coupler-switch. Care in design, or active control may be needed, however, to ensure a flat slab and thus equal actuation of the input 212 and output 214 switches. The interferometer arms 216, 218 are balanced as in the previous embodiment, with equal lengths of waveguide on the top and bottom layer and identical waveguide bends—with the exception that a $\pi$ phase shift is introduced in one arm 216, and a filter is introduced in one arm (218 in this case).

Figure 13:
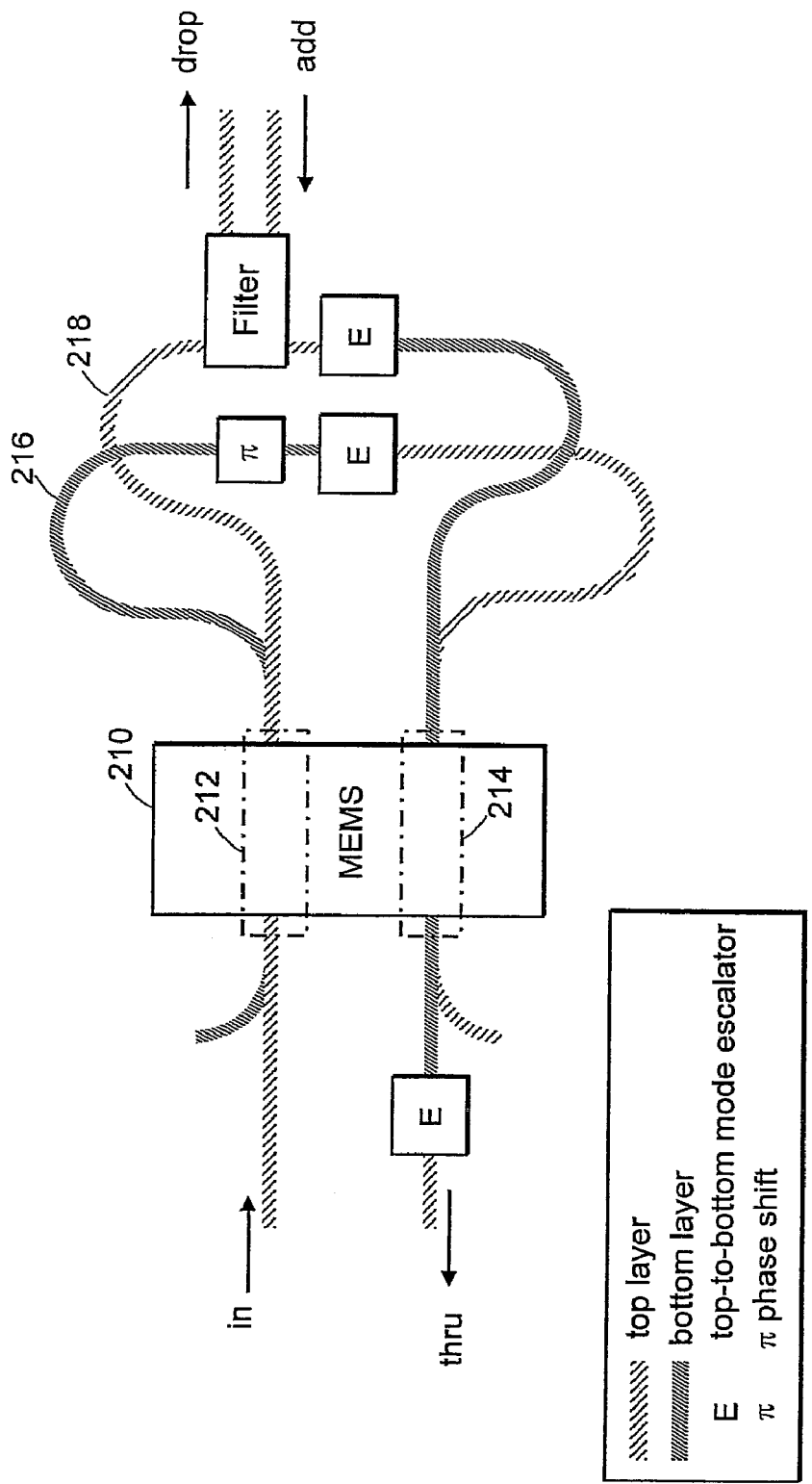
FIG. 13 is a schematic diagram illustrating an implementation of the spatial diversity scheme for hitless switching that is identical to the scheme depicted in FIG. 12 except that the geometry is folded such that the two MEMS switches utilize a single MEMS membrane.
Figure 14A:
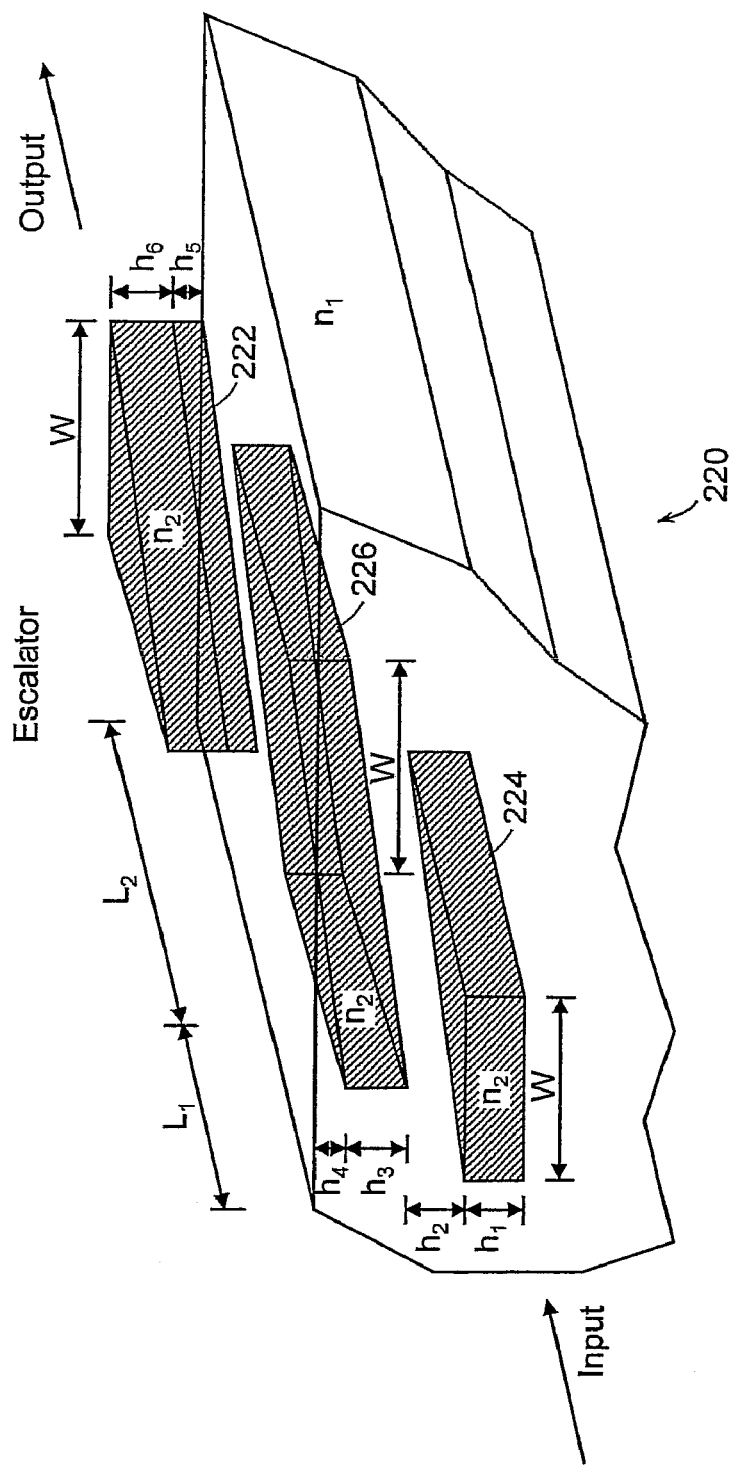
FIG. 14A illustrates a layer-to-layer coupling waveguide escalator structure and FIG. 14B shows a graph demonstrating the performance of the structure.
Figure 14B:
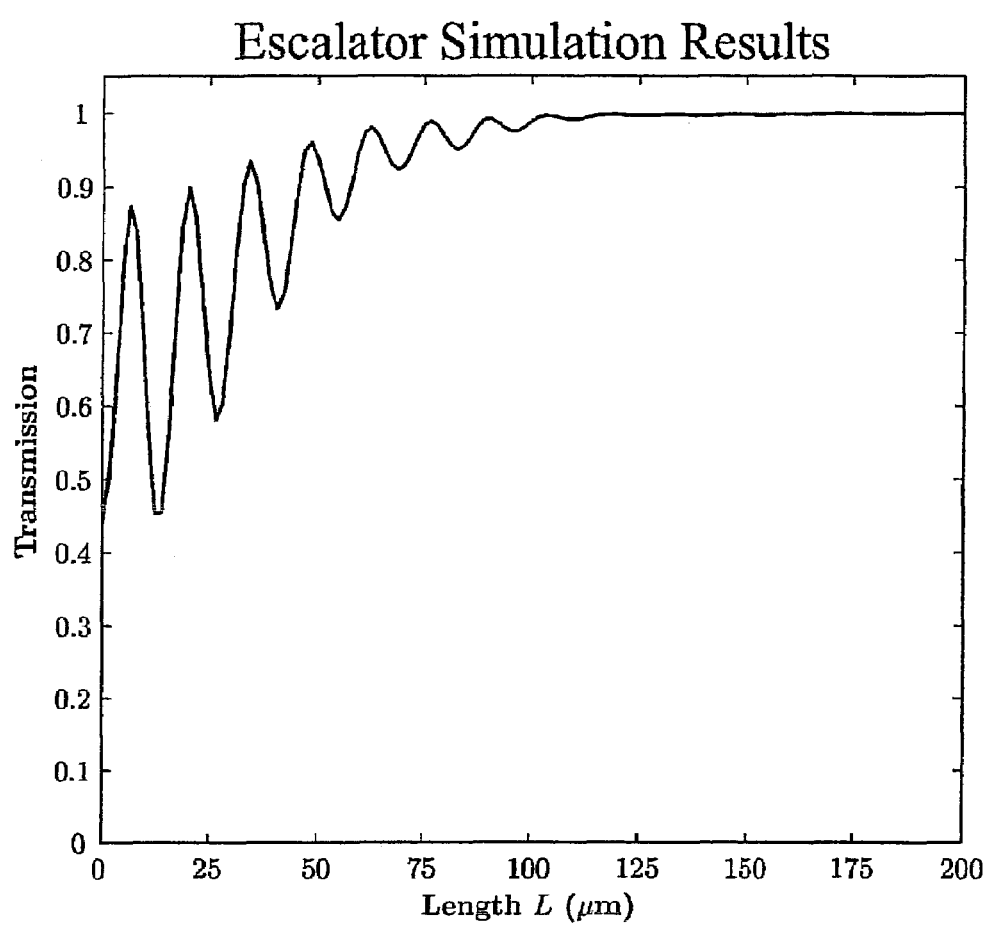

The vertically-actuated two-layer configuration in FIGS. 11, 12, 13 requires that the waveguides must swap layers in the intermediate arms in order for a top-mounted MEMS-actuated dielectric slab to provide an opposite $\Delta\beta$ for the second switch as required. This requires inter-layer optical coupling that can be achieved with adiabatically tapered "escalator" waveguide designs, indicated by "E" in FIGS. 12, 13. One such design 220 is depicted in FIG. 14A, where in addition to the two waveguide layers 222, 224 used for the switch (184, 186 in FIG. 11A, respectively), a vertically intermediate core layer 226 is employed. In the particular escalator design used for the eigenmode-expansion-method simulation results shown alongside the diagram the device length $L=L_1+L_2=100$ µm was used where $L_1$ represents the length of the transition from the lower to middle layer and $L_2$ the length of the transition from the middle to upper layer and with $L_2=2L_1$. Here again, the guide dimensions and indices were set to $h_1=0.28$ µm, $h_2=0.28$ µm, $h_3=0.28$ µm, $h_4=0.19$ µm, $h_5=0.1$ µm, $h_6=0.33$ µm, $h_7=0.4$ µm, w=1.05 µm, $n_1=1.445$, $n_2=2.2$, and $n_2=1.72$. The escalator adiabatic-waveguide couplers of lengths of 100 µm and more have negligible loss.

From FIGS. 11A,B it is seen that for the hitless switching configurations in FIGS. 12,13, the MEMS slab 190 is down under normal operation, preventing coupling and keeping light in the same waveguide in which it enters the directional couplers 194, 196, 212, 214, thus routing the input signal through the filter. When the MEMS slab is raised, the signal crosses into the opposite waveguide in each switch 194, 196, 212, 214 and the signal is routed around the filter through the bypass path (216 in FIG. 13).

Alternatively, single-layer MEMS-perturbation schemes may be pursued akin to similar applications of MEMS perturbation used for ring tuning. Of course, for the scheme presented, any realization of $\Delta\beta$ switch or $\pi$ phase shift will work, including both single-layer and multiple-layer switch implementations.

Figure 15:
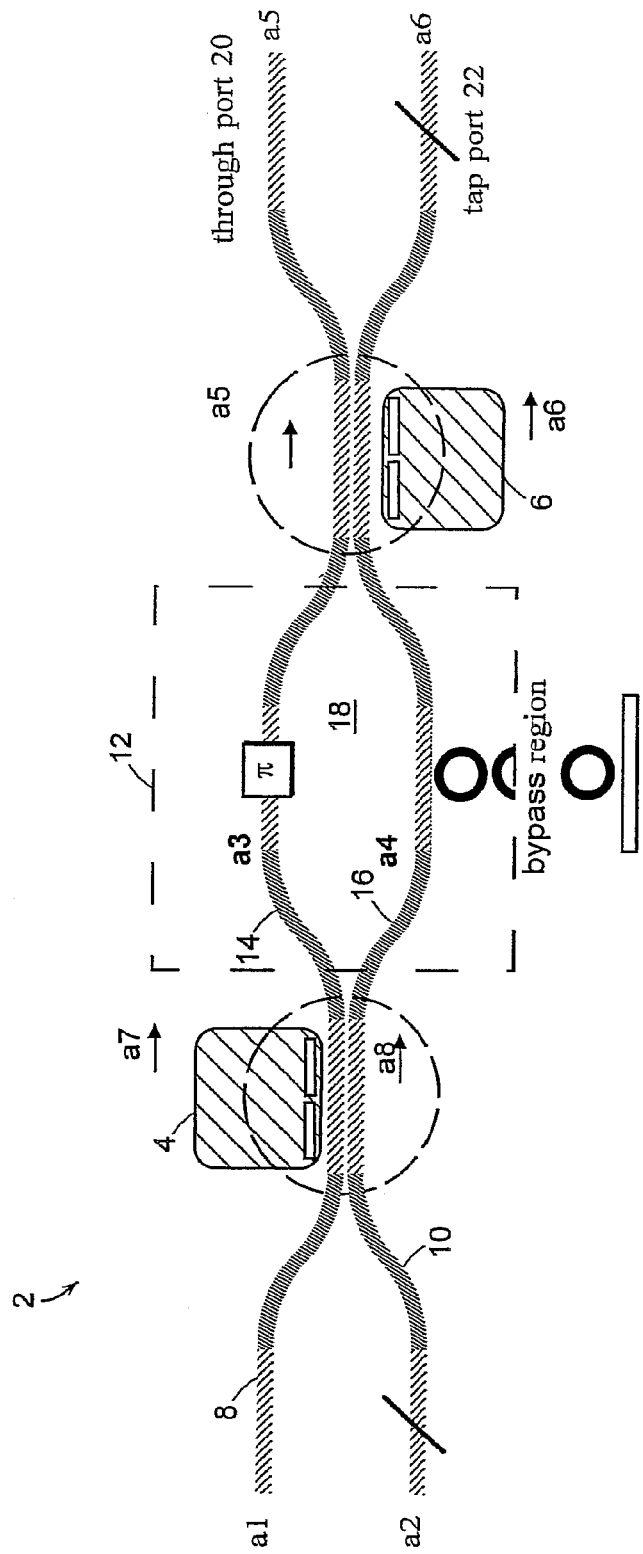
FIG. 15 is a schematic diagram illustrating a single-layer spatial diversity scheme for hitless switching utilizing $\Delta\beta$ switches based on a pair of dielectric MEMS-based waveguide perturbing devices with lateral motion.

FIG. 15 illustrates another embodiment of a hitless switch 2 in accordance with the invention. The hitless switch 2 includes two cascaded directional couplers 4, 6, two input signal bus waveguides 8, 10, and a bypass region 12. The first input signal bus waveguide 8 inputs a signal a1 and the second signal bus waveguide 10 input a signal a2. The signal a1 and a2 are inputted to the directional coupler 4. The bypass region 12 receives the output signals a7 and a8 of the directional coupler. The bypass region 12 includes a Mach Zehnder structure 18. The two arms 14, 16 of the Mach Zehnder structure 18 form bypass waveguides that receive as input the output signals a7 and a8 of the directional coupler 4. The bypass region 12 performs finite reconfiguration time operations on signals a7 and a8, and produces output signals a3 and a4 that are provided to the second directional coupler 6. The second directional coupler 6 further processes the signals a3 and a4 and produces output signals a5 and a6. The output signals a5 and a6 are provided to the throughput port 20 and tap port 22.

Note the directional couplers 4, 6 include microelectromechanical perturbations to perform their processing. Moreover, the microelectromechanical dielectric slab perturbs the waveguide mode on the same vertical plane, through a sliding motion of the dielectric slab. The microelectromechanical (MEMS) dielectric perturbation gives a phase mismatch, and hence detuning, of the directional coupler. The inventive designs described herein permit a hitless switch to be constructed in a single-level, permitting reductions in device micro- and nano-fabrication complexity. This translates to improvements in device yield, reduction in costs and manufacturing completion time.

Other alternatives for an integrated hitless switch include an alternating-$\Delta\beta$ optical waveguide coupler. In these alternatives, the directional couplers are typically electro-optically switched. The switched directional couplers can also be surface waves generated through a transducer, differing from the usage of dielectric slab perturbation. Finally, bypass switches in free-space optics with MEMS micromirrors have been suggested for optical fiber data distribution, though these developments do not use the switched directional couplers discussed herein and are not feasible for high-density integrated optics.

Figure 16:
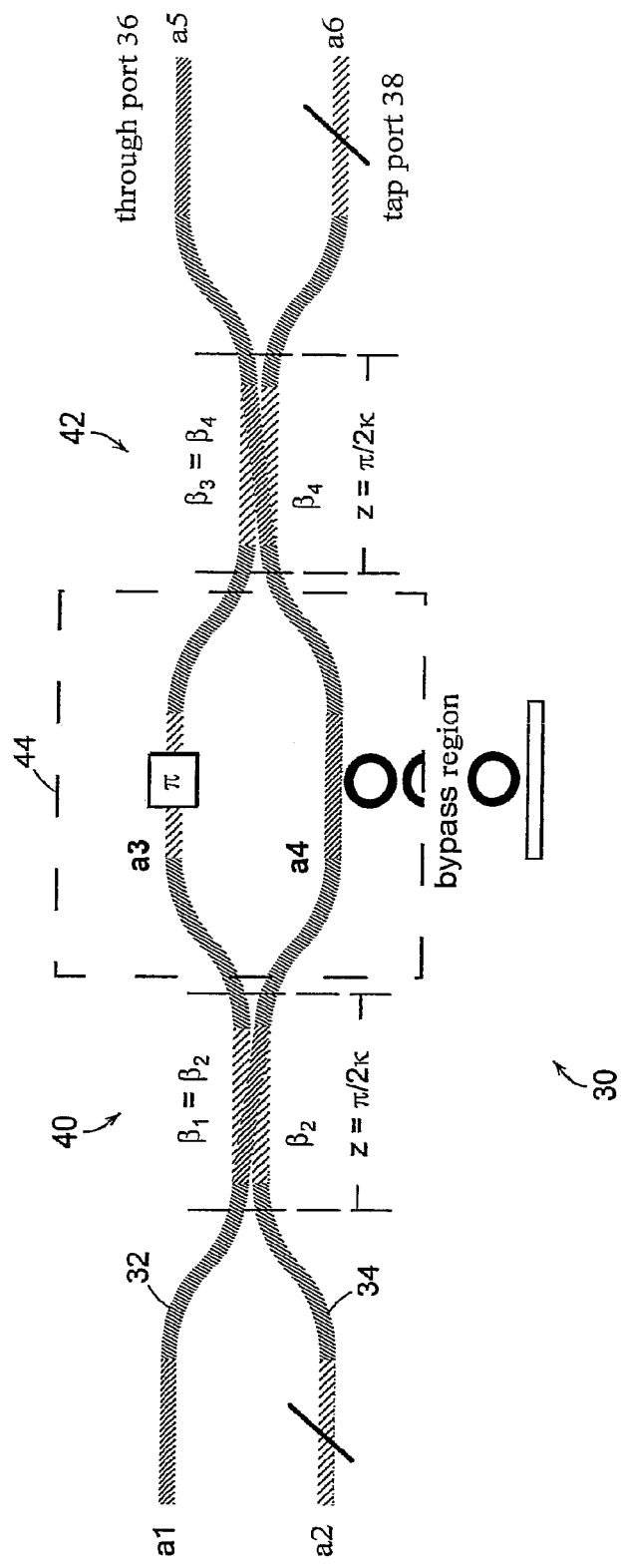
FIG. 16 is a schematic diagram illustrating a beam propagation path before MEMS perturbation.

FIG. 16 shows a beam propagation path 30 that does not use MEMS perturbation. As shown in FIG. 16, a signal a1 enters at the signal bus waveguide 32 and exits at the through port 36 with a signal a5. In FIG. 16, the couplers 40, 42 are designed for the minimum conversion length, $z=\pi/2\kappa$, where $\kappa$ is the waveguide coupling coefficient, such that there is complete crossover of the light from one guide to the other. The fields in the coupled waveguides can be modeled through coupled mode theory. For example, the field amplitudes a3 and a4 in the bypass region 44, as shown in FIG. 15, are $$a3(z)/e^{-i\bar{\beta}z} = a1(\cos\beta_o z - i(\delta/\beta_o)\sin\beta_o z) + a2(\kappa_{12}/\beta_o)\sin\beta_o z \quad (14)$$

$$a4(z)/e^{-i\bar{\beta}z} = a1(\kappa_{21}/\beta_o)\sin\beta_o z + a2(\cos\beta_o z + i(\delta/\beta_o)\sin\beta_o z) \quad (15)$$

where a1, a2=the field amplitudes at the two input guides 32, 34, $\kappa_{12}=-\kappa_{21}^*=\kappa$, $\beta_o=(\delta^2+\kappa^2)^{0.5}$, $\delta=(\beta_1-\beta_2)/2$, $\bar{\beta}=(\beta_1+\beta_2)/2$, and $\beta_1$ and $\beta_2$ are the propagation constants in waveguide 32 and 34, respectively, in optical coupler 40.

The coupling coefficient $\kappa$ is estimated through a mode solver, and the design verification is done through finite-difference time-domain numerical computations. The signals a5, a6 in the through port 36 and tap port 38 can be found by repeating equations (14) and (15) for the second directional coupler 42, with a3 and a4 replacing a1 and a2 as the inputs and $\delta'=(\beta_3-\beta_4)/2=-(\beta_1-\beta_2)/2=-\delta$, $\bar{\beta}=(\beta_3+\beta_4)/2=(\beta_1+\beta_2)/2$, $\beta_3$ and $\beta_4$ the propagation constants in waveguide 32 and 34 respectively, in optical coupler 42. The extinction ratio is defined as $|a4|^2/|a3|^2$. With the MEMS perturbation such that $\delta=3^{1/2}\kappa$, there is zero net crossover of signal from signal bus waveguide to the coupled waveguide.

Figure 17:
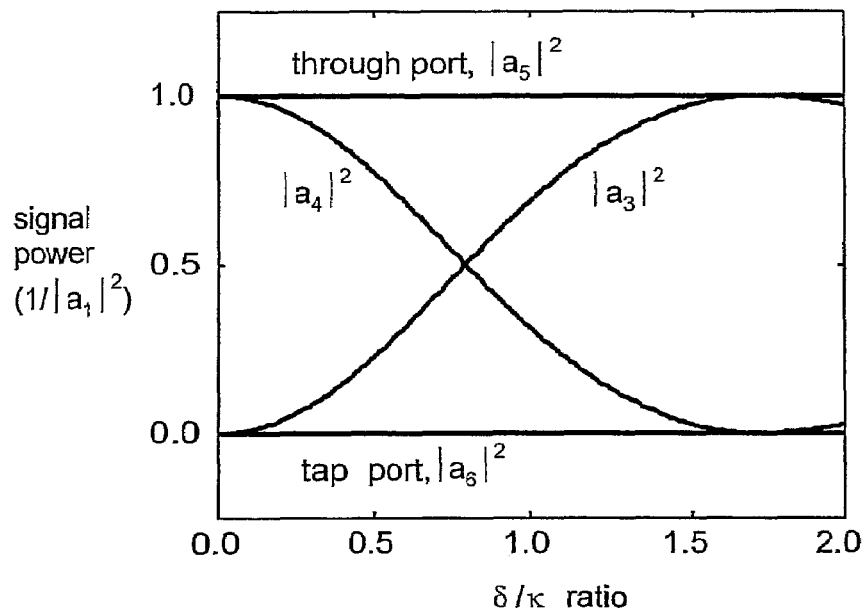
FIG. 17 is a graph demonstrating signal power against various $\delta/\kappa$ ratios.
Figure 18:
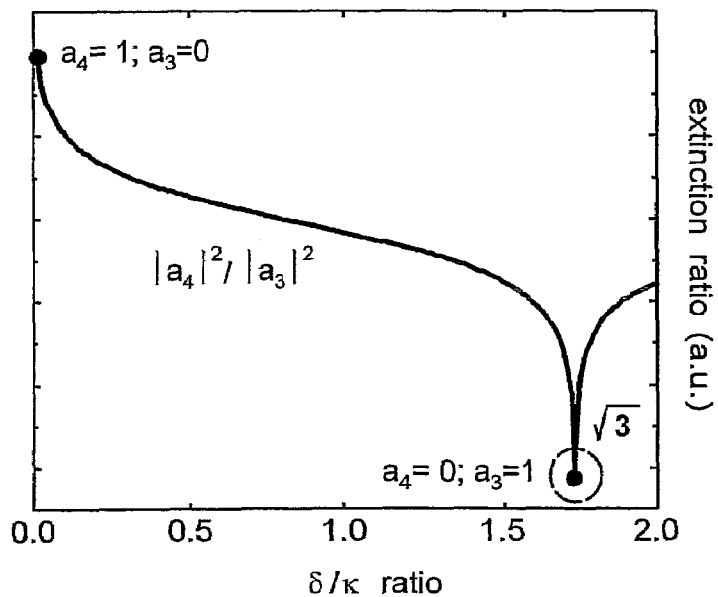
FIG. 18 is a graph demonstrating the extinction ratio in the bypass region against various $\delta/\kappa$ ratios.

The calculated signal power, normalized by the input power $|a1|^2$, is shown in FIG. 17 for various $\delta/\kappa$ ratios. The resulting extinction ratio is also shown in FIG. 18.

Note that the coupled mode theory formalism predicts zero crosstalk for $\delta=0$ when switching in one designed directional coupler. However, a very low, but finite, crosstalk is expected due to the index perturbation necessary for switching. Design for low crosstalk is, therefore, desirable in the adiabatic separation region of the couplers. Scattering losses in the waveguides could also contribute to the crosstalk degradation.

In the matrix formalism, eq. (14) and (15) for the first coupler 40, disregarding the common propagation factor $e^{-i\bar{\beta}z}$, assume the form:

$$\begin{bmatrix} a3 \\ a4 \end{bmatrix} = \begin{bmatrix} \cos\beta_o z - i(\delta/\beta_o)\sin\beta_o z & (\kappa_{12}/\beta_o)\sin\beta_o z \\ (\kappa_{21}/\beta_o)\sin\beta_o z & \cos\beta_o z + i(\delta/\beta_o)\sin\beta_o z \end{bmatrix} \begin{bmatrix} a1 \\ a2 \end{bmatrix} = \bar{\bar{U}} \cdot \begin{bmatrix} a1 \\ a2 \end{bmatrix} \quad (16)$$

while for the second coupler 42 (opposite-sign detuning $\delta'=-\delta$) they assume the form:

$$\begin{bmatrix} a5 \\ a6 \end{bmatrix} = \begin{bmatrix} \cos\beta_o z - i(-\delta/\beta_o)\sin\beta_o z & (\kappa_{12}/\beta_o)\sin\beta_o z \\ (\kappa_{21}/\beta_o)\sin\beta_o z & \cos\beta_o z + i(-\delta/\beta_o)\sin\beta_o z \end{bmatrix} \begin{bmatrix} a1 \\ a2 \end{bmatrix} = \bar{\bar{U'}} \cdot \begin{bmatrix} a1 \\ a2 \end{bmatrix} \quad (17)$$

wherein $\overline{U}'$ is seen to be the diagonal transpose of $\overline{U}$ for any value of δ. This result is consistent with the fact that, as shown in FIGS. 15 and 16, the second optical coupler 42 is 180 degrees rotated with respect to the first coupler 40 and that the two couplers are identically actuated (in absolute value of respective δ). This is consistent with the general scheme of FIGS. 1,2.

Figure 19:
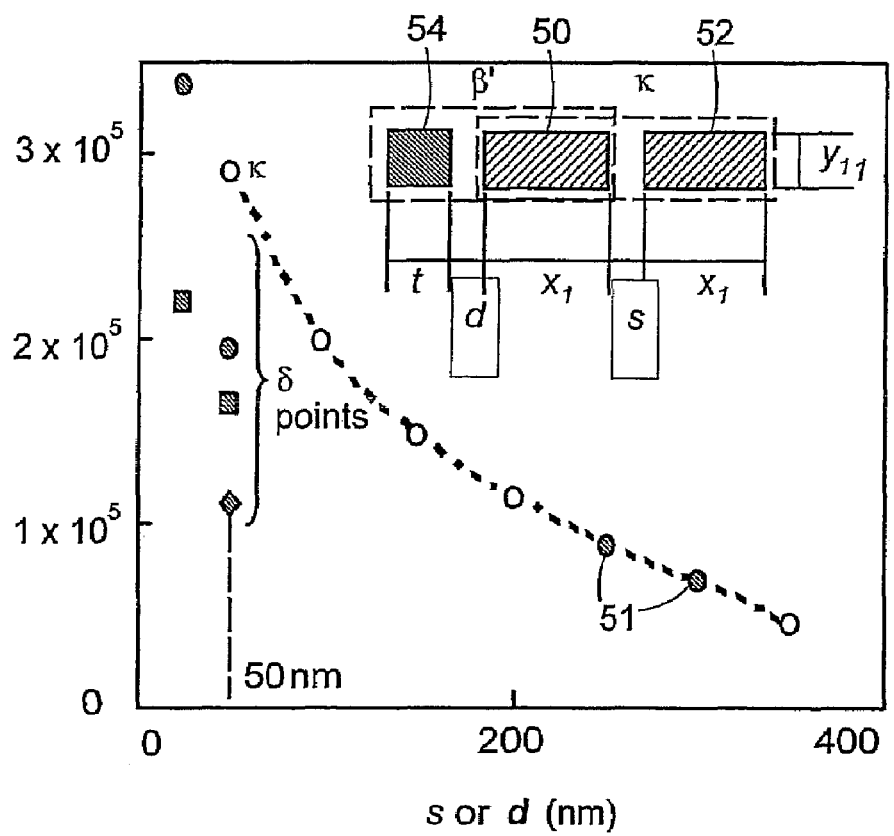
FIG. 19 is a graph and schematic diagram illustrating the designed $\kappa$ values for various directional coupler gap separations, s, and designed $\delta$ for various gap regions, d, and thicknesses, t, of a MEMS-actuated dielectric slab.

As an example, a $SiN_x$ material system is chosen (refractive index n~2.2) to form two signal bus waveguides 50, 52 shown in FIG. 19 with a width $x_L$ of approximately 700 nm and a thickness $y_L$ of approximately 300 nm for single-mode guidance. The gap separation s between the waveguides 50, 52 is approximately 250 nm. This provides a coupling coefficient of approximately $88 \times 10^3$ $m^{-1}$ (shown in FIG. 19) which translates to a coupling length of approximately 17.8 μm. For $|a4|=0$ and $|a3|=1$, respectively in paths 16 and 14 in FIG. 15, the perturbation δ is approximately $152 \times 10^3$ $m^{-1}$. This perturbation δ is achievable through MEMS. This is calculated using a mode-solver. The perturbation slab has a thickness, t, of approximately 450 nm and a gap d of approximately 50 nm. A summary of the designed results are also shown in FIG. 19.

As shown in FIG. 19, the coupling coefficient drops exponentially with increasing gap s. More importantly, FIG. 19 shows one can design perturbation δ with magnitude on order of the required $3^{1/2}$ κ using MEMS perturbation to achieve complete phase mismatch in the directional couplers. Examples of two selected gaps s for the directional coupler are also shown at points 51 in FIG. 19, with s=250 and 300 nm respectively. With these s dimensions, the perturbation δ can be easily designed for sufficient mismatch on the directional couplers.

Figure 20B:
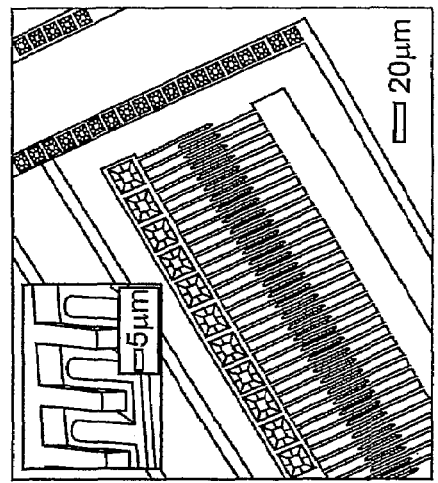
FIG. 20B is a scanning electron micrograph of the comb-drives used in the in-plane sliding actuator mechanism shown in FIG. 20A.
Figure 20A:
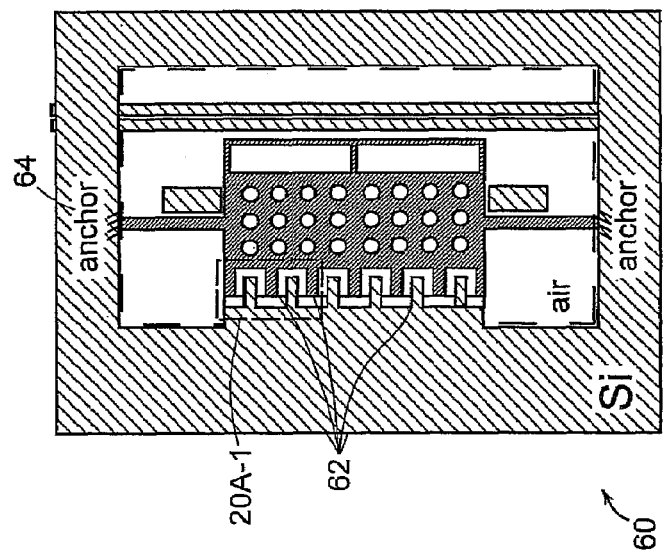
FIG. 20A is a schematic diagram illustrating an in-plane sliding actuator mechanism.

An in-plane sliding actuator mechanism 60, as shown in FIG. 20A, can be used to form the necessary perturbation discussed herein. The in-plane sliding actuator 60 includes interdigitated comb-drive "fingers" 62 that are actuated by applying a differential voltage between the fingers 62, shown in FIG. 20A. The electrostatic attractive force is mainly due to the fringing fields. In this comb-drive actuator 60, the capacitance (expressed with first-order accuracy as $\epsilon A/g$, where $\epsilon$ is the permittivity of the medium surrounding the comb-drive fingers 62) is varied through changing the area A linearly, instead of the gap g nonlinearly between two parallel capacitance plates. The elements A and gap g are shown in more detail in the inset in FIG. 20A. The result is an actuator force approximately proportional to the square of the applied voltage. Compared to a parallel capacitance plate actuator mechanism, electrostatic comb-drives 62 have better controllability since it is less susceptible to pull-in instability from the positive feedback in parallel capacitance plate designs. Capacitive position sensing could also be performed. A scanning electron micrograph of the comb-drives are shown in FIG. 20B.

The supporting beams 64 can be designed for sufficient stiffness on order of 0.5 N/m, cantilever lengths of order 150 μm, widths of order 5 μm, and thickness of order 0.3 μm, for order 1 nm displacement resolution of the perturbing dielectric slab. Following this example, the number of comb-drive finger pairs 62 is on order of 50, with a gap of 1 μm between the fingers, and applied voltages between 1 V for a 1 nm displacement and 50 V.

During actual device fabrication and operation, the device geometry and perturbation deviates from ideal theoretical design. The sensitivity from imperfect fabrication and operation, caused by: (i) asymmetric MEMS perturbation, (ii) variation in π-phase shift, and (iii) asymmetric directional couplers are described in the following. These variations results in a loss in through port signal in at least some switch states, leading to insertion loss and/or "hit loss" during reconfiguration.

Figure 21:
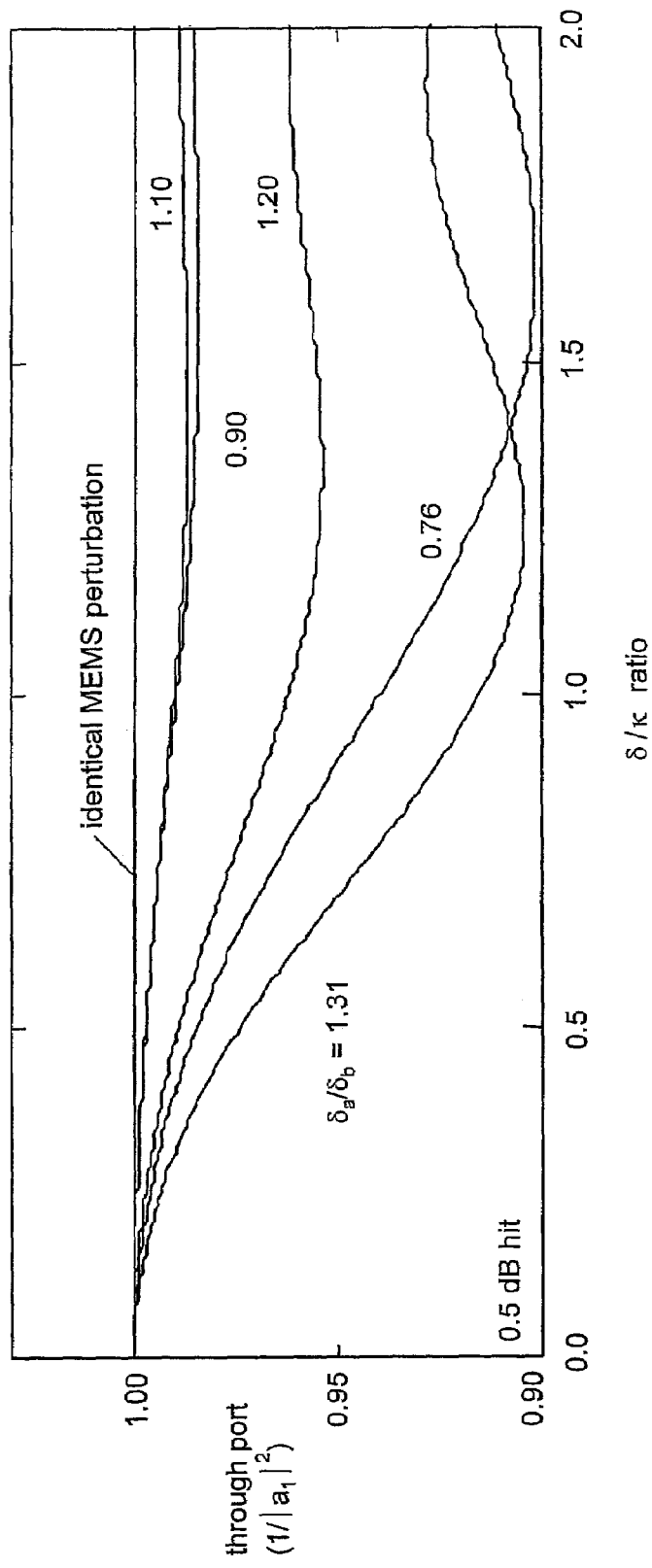
FIG. 21 is a graph illustrating signal loss from non-ideal, asymmetric MEMS perturbation against various $\delta/\kappa$ ratios.

Asymmetric MEMS perturbation arises when the two dielectric slabs do not arrive at exactly the same time and position. FIG. 21 illustrates the through port signal (normalized by $|a1|^2$) for various δ/κ ratios. The various lines refer to different magnitudes of asymmetry, such as when the first perturbing slab having $\delta_a$ 31% larger than the second perturbing slab $\delta_b$. From FIG. 21, it is observed that if the two MEMS perturbing slab δ's are controlled within 0.76 to 1.31 times of each other, one can get a 0.5 dB signal loss in the through port. The sensitivity is nonlinear, however; for larger asymmetries, the signal loss is significantly larger.

Figure 22:
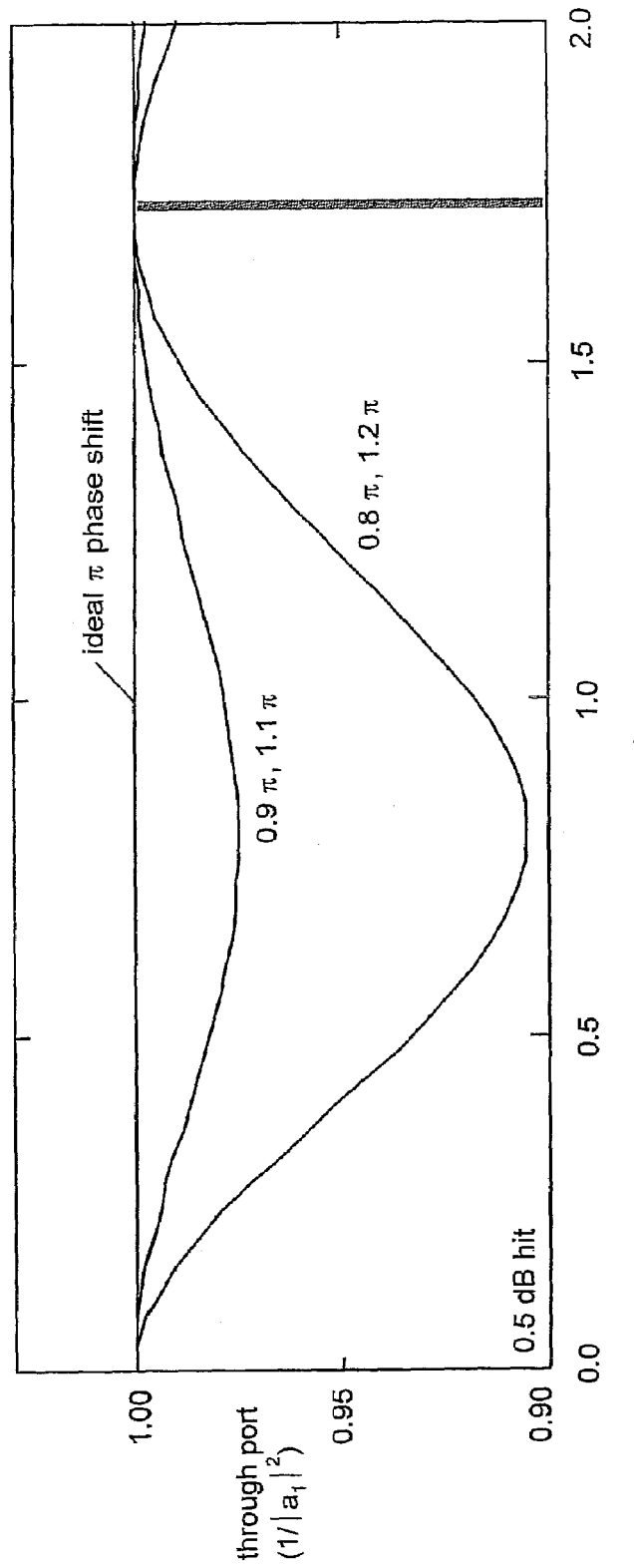
FIG. 22 is a graph demonstrating signal loss due to deviation from ideal $\pi$-phase shift against various $\delta/\kappa$ ratios, wherein the deviation arises from actual device fabrication.

Secondly, the effect of variations in the π-phase shift is illustrated in FIG. 22. The variation arises either from asymmetry in the two waveguides arms causing different phase delays or from different input signal frequencies, since the π-phase shift is geometrically designed for one particular frequency. For a ±20% variation from the ideal π-phase shift, a 0.5 dB hit is predicted; for a ±1.3% variation, a negligible (less than 0.01 dB) hit is predicted. The 1.3% deviation in π-phase shift arises from operation in the C-band (~1530 to 1570 nm) with the device designed for operation at 1550 nm, and the phase shift physically realized in the identical pair of waveguides 14, 16 as a half-guided-wave difference in length at 1550 nm wavelength.

In addition, each directional coupler has a frequency dependence between 1530 to 1570 nm, ranging from 5-10% variation of the coupling κ at 1550 nm. However, even if conversion lengths are designed only for operation at 1550 nm, the two cascaded directional couplers as a whole are broadband, as demonstrated by equation (5). Operating away from 1550 nm, there is incomplete crossover ("leakage") at the first directional coupler but this leakage is destructively interfered at the output of the second directional coupler.

Figure 23:
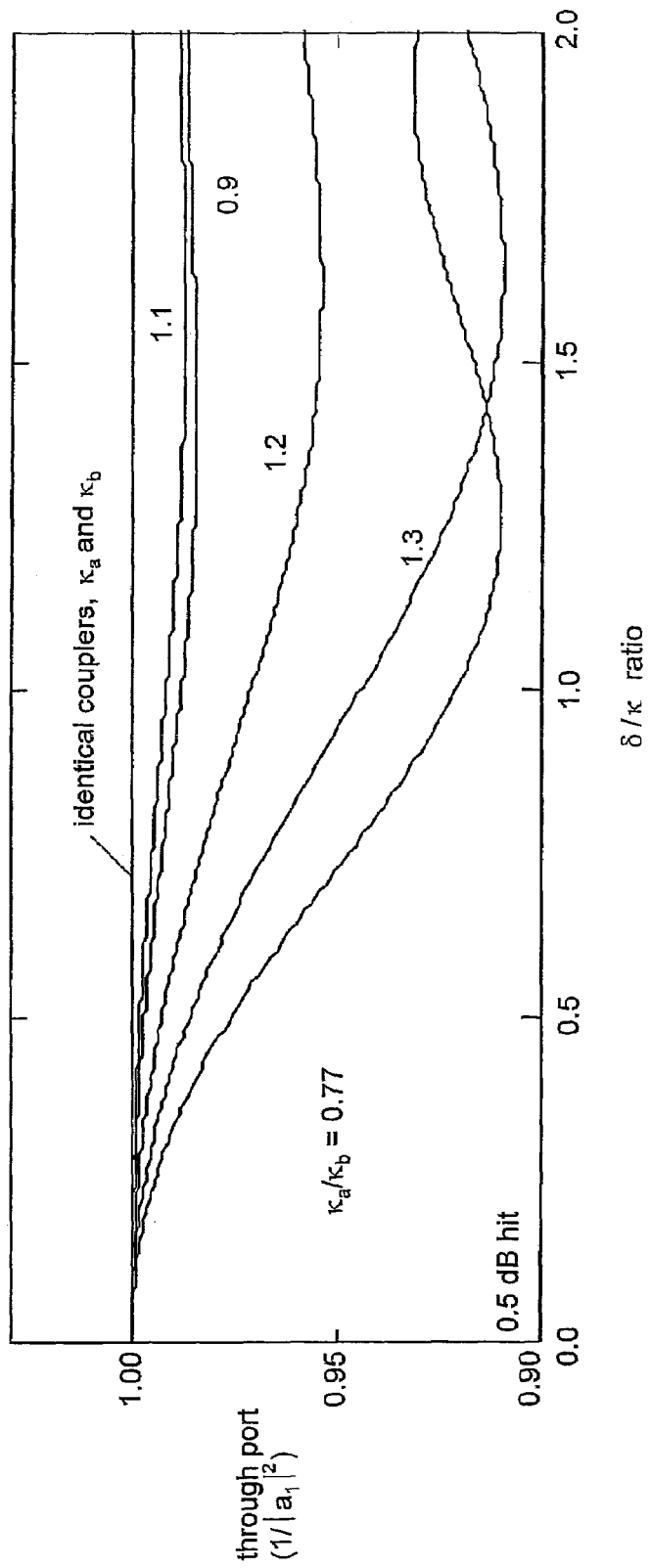
FIG. 23 is a graph demonstrating signal loss from asymmetric directional couplers against various $\delta/\kappa$ ratios.

Thirdly, the effects of asymmetric couplers are described in FIG. 23. For a threshold signal loss of 0.5 dB, for example, the device can tolerate a differential variation between $\kappa_a$ and $\kappa_b$ of approximately 0.77 to 1.30 times of each other.

Figure 24A:
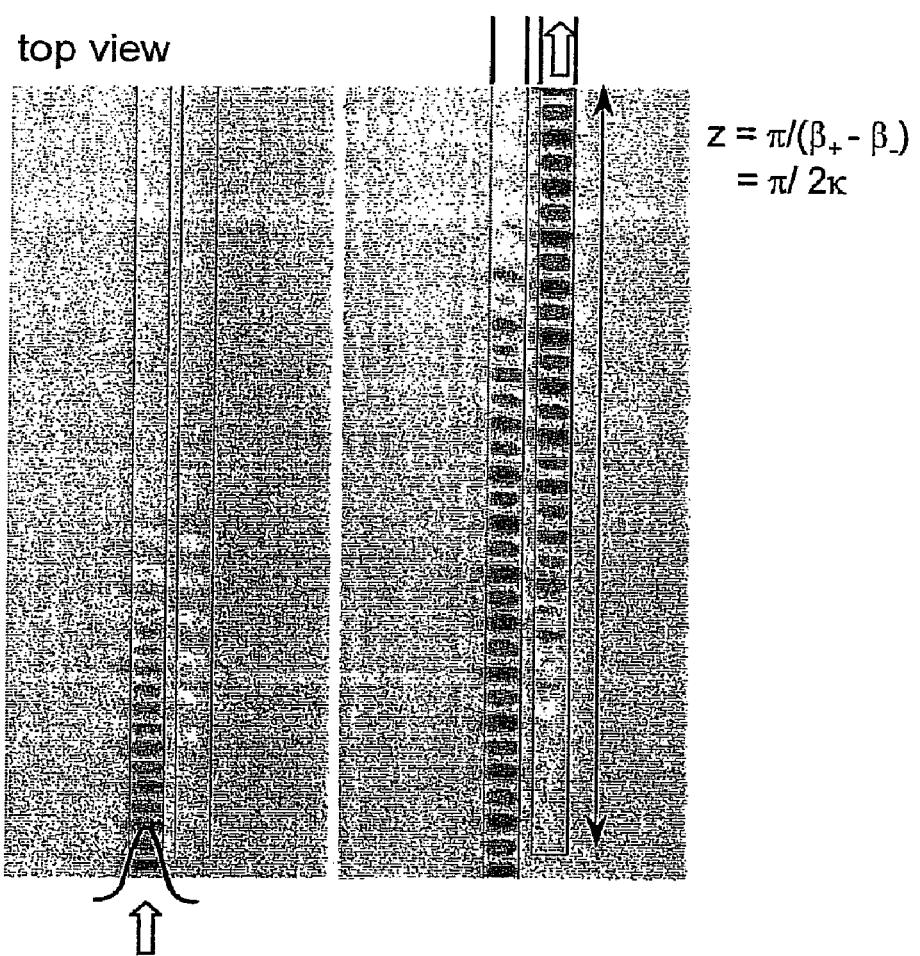
FIGS. 24A-24B are two-dimensional finite-difference time-domain diagrams verifying the expected properties of the single-layer, laterally actuated MEMS hitless switch.
Figure 24B:
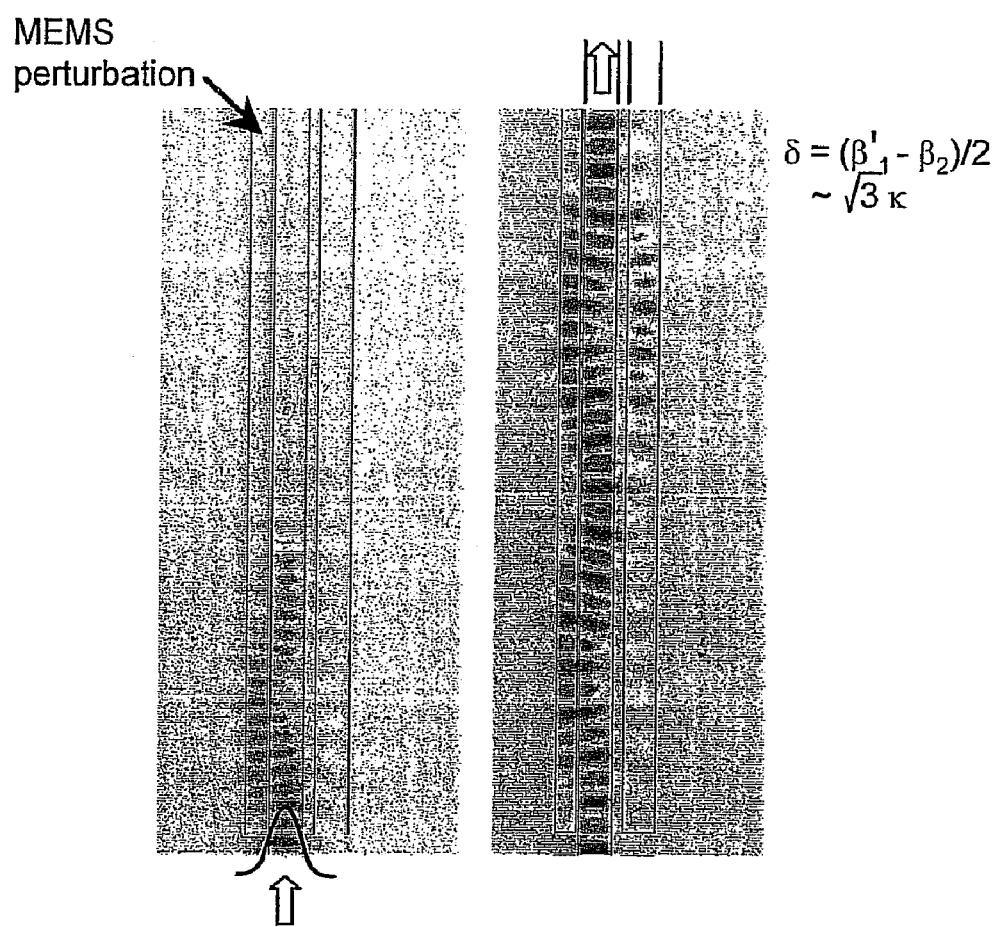

Finite-difference time-domain (FDTD) calculations, as shown in FIGS. 24A-24B, are performed to verify the results from coupled mode theory and the mode solver. The FDTD is performed in 2-dimensions with the effective index determined from a perturbation approach. FIG. 24A shows complete crossover for the designed conversion length of 15.1 μm in the designed directional coupler, with specific dimensions described. When perturbed with $\delta \sim 3^{1/2}$ κ (d=50 nm and t=450 nm), a zero net crossover is observed. This is illustrated in FIG. 24B. This confirms the validity of the device concept and design.

Figures 1, 20A:
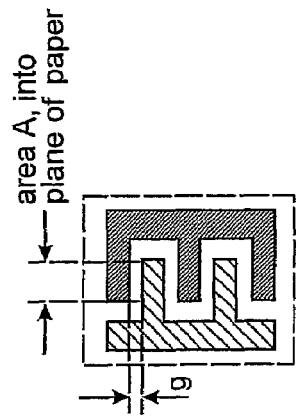

By removing the need to switch lithographic layers for inputs of DCM2 (directional-coupler MEMS 42 in FIG. 16) with respect to inputs of DCM1 (40 in FIG. 16), in comparison to the multi-layer implementation of FIGS. 11-14, and designing the MEMS dielectric perturbation on the same vertical plane of the waveguides, the device implementation can be reduced to a single-level—with a single lithography step—as described in FIG. 20. This permits reductions in device micro- and nano-fabrication complexity. This also translates to improvements in device yield, reduction in costs and manufacturing completion time.

Figure 25A:
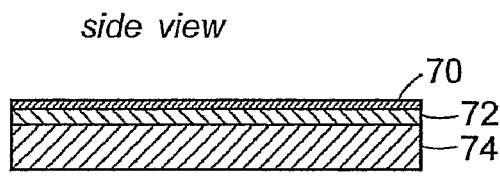
FIGS. 25A-25C are process flow diagrams illustrating the formation of the single-layer MEMS-based optical switch.
Figure 25B:
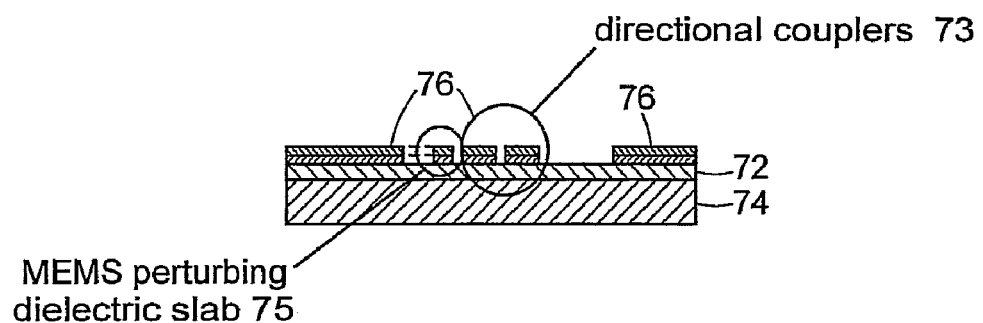
Figure 25C:
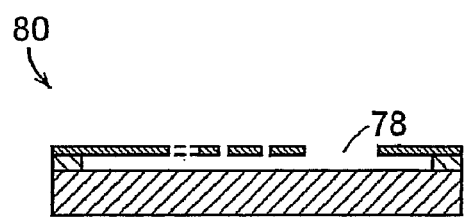

The fabrication process flow, showing the top view and side profile of the invention, is illustrated in FIGS. 25A-25C. For a $SiN_x$ material system, the first step is to deposit low-pressure chemical-vapor-deposition nitride 70 on a silicon dioxide layer 72. Note the silicon dioxide layer 72 is formed on a substrate 74. Note a Si material system having a 200 nm Unibond Silicon-On-Insulator wafer can be used in place of the $SiN_x$ material system. The SOI wafer can include a Si top layer, silicon dioxide layer, and substrate. The second step is to define the device geometry with an electron-beam lithography step, as shown in FIG. 25B. Note a Cr layer 76 is deposited on the top layer 70 the $SiN_x$. This step concurrently defines the directional couplers 73, the MEMS dielectric slabs 75, and other structures such as the waveguides, supporting structure, and the electrostatic comb-drives. If electron-beam lithography is not used, a photoresist layer can be used to form the device geometry. The final step is to release the MEMS structure through a buffered oxide etch 78 that removes the oxide 72 underneath the MEMS structure, as shown in FIG. 25C. This step also removes the cladding underneath the directional couplers.

Although the present invention has been shown and described with respect to several preferred embodiments thereof, various changes, omissions and additions to the form and detail thereof, may be made therein, without departing from the spirit and scope of the invention.

What is claimed is:

1. An optical device comprising:
    a first and a second splitting device, each of the first and second splitting device having respective first and second input port, respective first and second output port and a respective transfer matrix;
    a first optical waveguide optically coupling the first output port of the first splitting device and the first input port of the second splitting device; and
    a second optical waveguide optically coupling the second output port of the first splitting device and the second input port of the second splitting device;
    wherein the first and second optical waveguide are configured to introduce a phase shift of radians to the optical radiation propagating through the first optical waveguide with respect to the optical radiation propagating through the second optical waveguide, said transfer matrix of the second splitting device is the diagonal transpose of the transfer matrix of the first splitting device and the transfer matrix of the second splitting device is substantially different from the transfer matrix of the first splitting device.

2. The optical device of claim 1 further comprising a functional optical element optically coupled along one of the first and second optical waveguide.

3. The optical device of claim 2 wherein the functional optical element is an optical filter.

4. The optical device of claim 2 comprising a further functional optical element optically coupled along the other of the first and second optical waveguide.

5. The optical device of claim 1, wherein each of the first and second splitting device is a switch.

6. The optical device of claim 5, wherein the transfer matrix of the second switch is the diagonal transpose of the transfer matrix of the first switch for any state of the switches.

7. The optical device of claim 1, wherein said first and second splitting device comprise directional couplers.

8. The optical device of claim 1, wherein said first and second splitting device comprise delta-beta switches.

9. The optical device of claim 1, wherein said first and second splitting device comprise MZI-couplers.

10. The optical device of claim 1, wherein said first and second splitting device comprise thermo-optic heaters.

11. The optical device of claim 1, wherein the off-diagonal elements of the transfer matrix of the first splitting device are substantially not equal.

12. A method of propagating optical radiation in an optical device comprising:
    providing a first and a second coupler, each of the first and second coupler having a respective transfer matrix;
    optically coupling a first optical waveguide to the first coupler and the second coupler;
    optically coupling a second optical waveguide to the first coupler and the second coupler;
    configuring the first and second optical waveguide to introduce a phase shift of to the optical radiation going through the first optical waveguide with respect to the optical radiation going through the second optical waveguide so that said transfer matrix of the second coupler is the diagonal transpose of the transfer matrix of the first coupler.

13. The method of claim 12 further comprising providing an optical filter optically coupled along one of the first and second optical waveguide.

14. The method of claim 12 further comprising providing an optical filter optically coupled along both the first and second optical waveguide.

15. The method of claim 12, wherein the first and second coupler are switchable couplers.

16. The method of claim 15, wherein the transfer matrix of the second coupler is the diagonal transpose of the transfer matrix of the first coupler for any state of the switchable couplers.

17. The method of claim 12, wherein said first and second coupler comprise directional couplers.

18. The method of claim 12, wherein said first and second coupler comprise MEMS structures.

19. The method of claim 12, wherein said first and second coupler comprise MZI-couplers.

20. The method of claim 12, wherein said first and second coupler comprise thermo-optic heaters.

21. The method of claim 12, wherein said transfer matrix of the second coupler is substantially different from the transfer matrix of the first coupler.

22. An optical device comprising:
    a first and a second splitting device, each of the first and second splitting device having respective first and second input port, respective first and second output port and a respective transfer matrix;
    a first optical waveguide optically coupling the first output port of the first splitting device and the first input port of the second splitting device; and
    a second optical waveguide optically coupling the second output port of the first splitting device and the second input port of the second splitting device;
    wherein the first and second optical waveguide are configured to introduce a phase shift of radians to the optical radiation propagating through the first optical waveguide with respect to the optical radiation propagating through the second optical waveguide, said transfer matrix of the second splitting device is the full transpose of the transfer matrix of the first splitting device, the transfer matrix of the second splitting device is substantially different from the transfer matrix of the first splitting device and the transfer matrix of the first splitting device has the off-diagonal elements equal

* * * * *